(12) United States Patent
Steele

(10) Patent No.: US 12,352,114 B2
(45) Date of Patent: Jul. 8, 2025

(54) NO-ROTATION LATCH COUPLING AND LATCH FOR CASING ASSEMBLIES

(71) Applicant: Halliburton Energy Services, Inc., Houston, TX (US)

(72) Inventor: David J. Steele, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/602,685

(22) Filed: Mar. 12, 2024

(65) Prior Publication Data

US 2024/0418044 A1  Dec. 19, 2024

Related U.S. Application Data

(60) Provisional application No. 63/521,826, filed on Jun. 19, 2023.

(51) Int. Cl.
*E21B 17/046* (2006.01)
*F16B 7/04* (2006.01)

(52) U.S. Cl.
CPC .......... *E21B 17/046* (2013.01); *F16B 7/042* (2013.01)

(58) Field of Classification Search
CPC ......... E21B 17/046; E21B 23/02; F16B 7/042
See application file for complete search history.

(56) References Cited

U.S. PATENT DOCUMENTS 8,376,054 B2  2/2013  Lang et al.
8,678,097 B1  3/2014  Telfer et al.
2004/0177970 A1  9/2004  Tessier et al.
2014/0144652 A1*  5/2014  Steele ............... E21B 23/03
                                            166/117.6
2018/0045005 A1*  2/2018  Holmberg ........... E21B 23/02
2018/0258701 A1*  9/2018  Saurer ................ E21B 47/024
2018/0340377 A1  11/2018  Eggers et al.

OTHER PUBLICATIONS

Qingming, et al., SPE International, IADC/SPE 156393, Case History of the First TAML Level 5 Junction on a Rod-Pump Well, 2012.

(Continued)

*Primary Examiner* — James G Sayre
(74) *Attorney, Agent, or Firm* — Scott Richardson; C. Tumey Law Group PLLC

(57) ABSTRACT

A system includes a downhole tubular and a latch assembly securable to a conveyance that is configured to lower the latch assembly into a central bore of the downhole tubular. The latch assembly includes a tubular body portion, a plurality of latch keys secured to the tubular body portion, and at least one alignment feature secured to the tubular body portion. The system further includes a latch coupling formed on the downhole tubular. The latch coupling includes a plurality of key profiles configured to engage corresponding key profiles of the plurality of key profiles in response to proper angular orientation of the latch assembly with respect to the latch coupling. Additionally, the system includes at least one guide feature configured to rotate the latch assembly to angularly align the plurality of latch keys with the plurality of key profiles in response to contact with the at least one alignment feature.

19 Claims, 21 Drawing Sheets

(56) References Cited

OTHER PUBLICATIONS

Schlumberger, SLIC, Selective lateral intervention completion system, 2019.
Schlumberger, RapidX, TAML 5 high-strength, hydraulic-sealed multilateral junction, 2021.
Halliburton, FlexRite Multilateral Completion System, Single-trip intelligent control installation and monitoring, 2023.
Halliburton, FloRite Multilateral Completion System, Junction pressure isolation with re-entry capability, 2023.
Halliburton, IsoRite Multilateral Completion System, Through-tubing lateral re-entry, 2023.
Schlumberger, RapidXtreme, TAML 3, 4, or 5 large-bore multilateral junction, 2024.
Halliburton, Case Study, First 9 5/8-in. ReFlexRite System Installation using XtremeGrip MLT System in Norway, H013445, Jan. 2020.
Schlumberger, Rapid Multilateral Systems, 2024.
Schlumberger, RapidX, TAML 5 high-strength, Hydraulic-Sealed Multilateral Junction, 2024.
Schlumberger, RapidX TAML 5 High-Strength, Hydraulic-Sealed Multilateral Junction, video, Jun. 2015.
International Search Report and Written Opinion for International Patent Application No. PCT/US2024/023061 dated Jul. 18, 2024. PDF file. 10 pages.

* cited by examiner

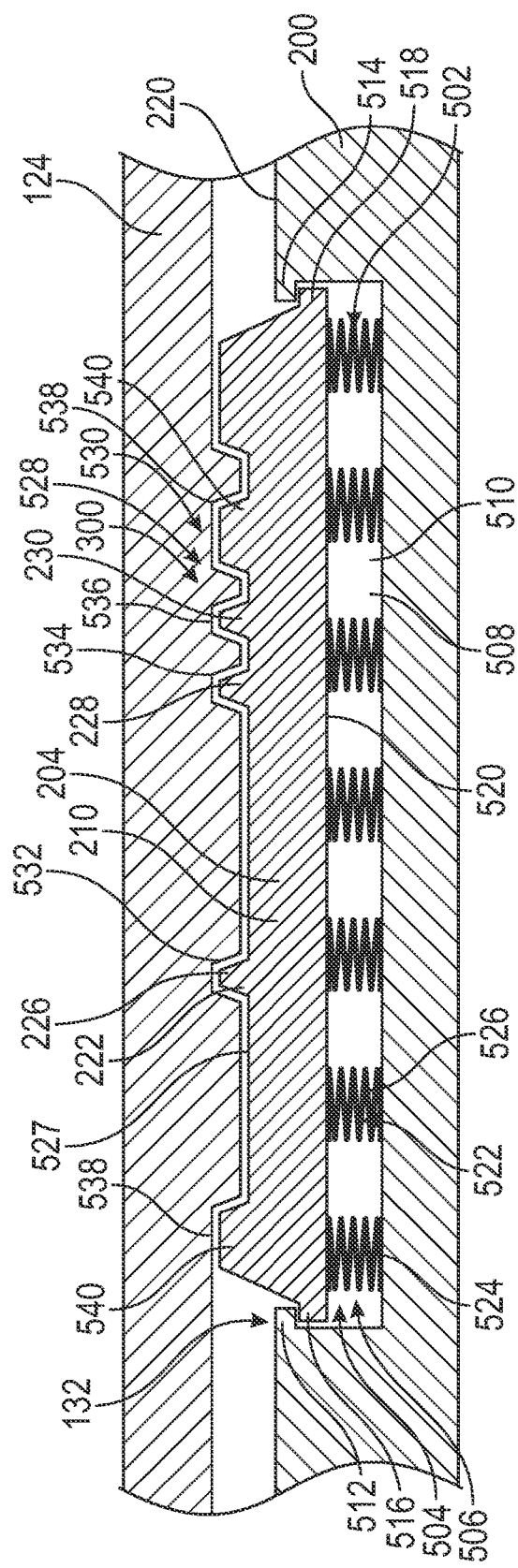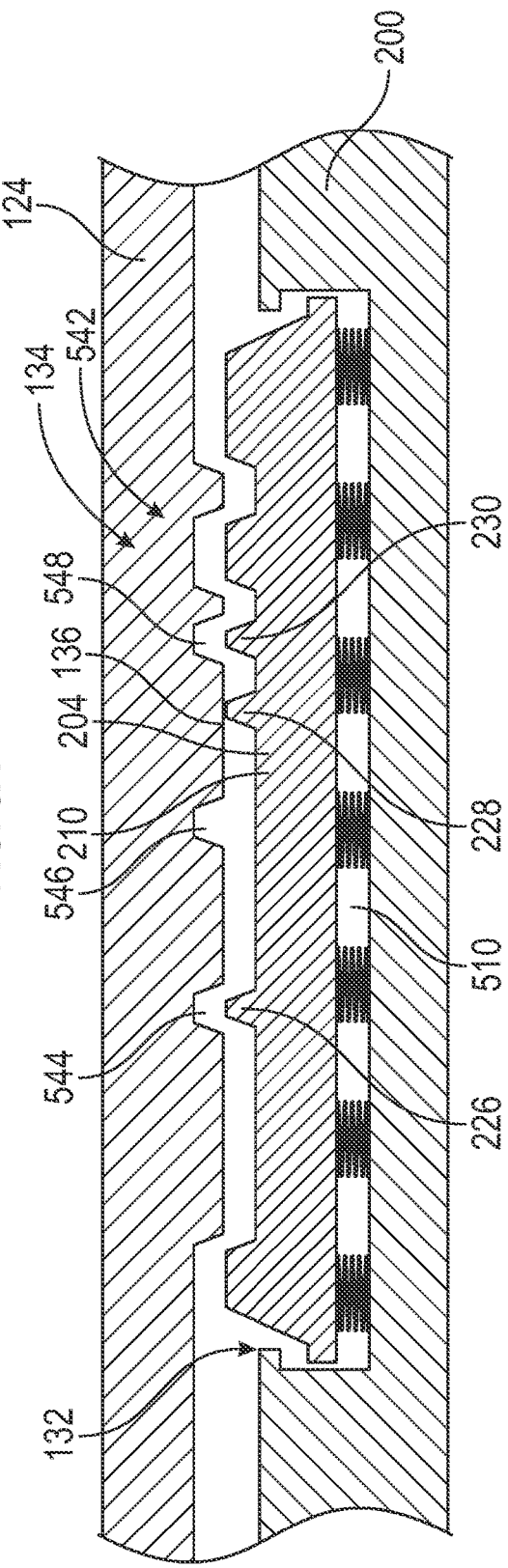
FIG. 5A
FIG. 5B

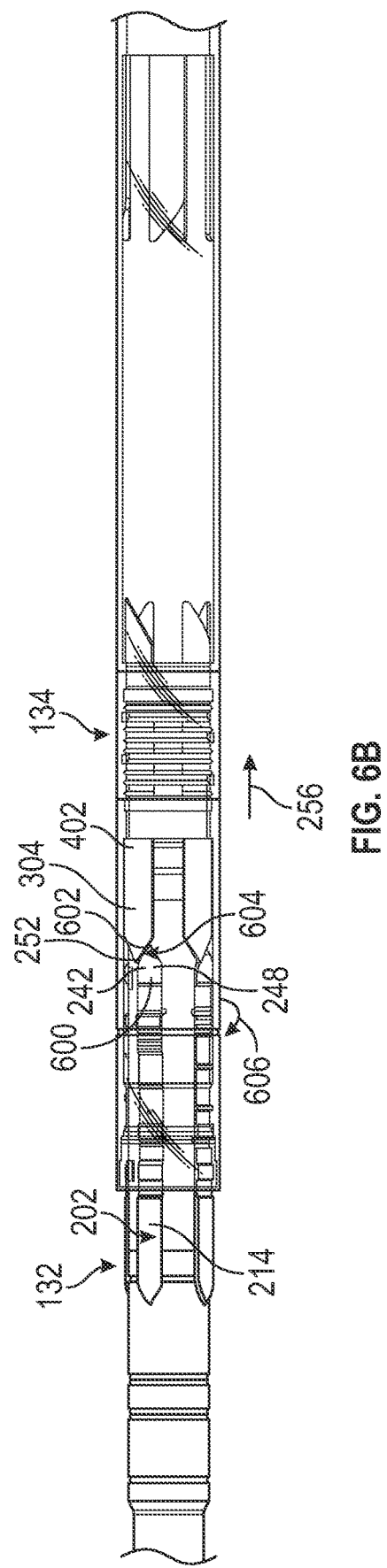

NO-ROTATION LATCH COUPLING AND LATCH FOR CASING ASSEMBLIES

CROSS-REFERENCE TO RELATED APPLICATIONS

The present application is a non-provisional conversion of U.S. Provisional Application Ser. No. 63/521,826, filed on Jun. 19, 2023, which is herein incorporated by reference in its entirety.

BACKGROUND

During completion operations, hydrocarbons can be produced through a wellbore traversing a subterranean formation. The wellbore can include one or more lateral wellbores extending from a parent (or main) wellbore. A lateral wellbore can be formed, for example, by diverting a milling tool from the main wellbore through an opening (e.g., a window) in a sidewall of a casing string that is disposed in the main wellbore. The casing string may include a plurality of windows with each window corresponding to a respective lateral wellbore. Further, a tubing string may generally be run-in-hole during completion operations. The tubing string may include various tools or components that can be used to produce hydrocarbons from the formation. The tubing string may include windows, or portions through which windows can be formed. Generally, aligning the casing string windows with the tubing string window, or a particular tubing string portion, is desirable for efficient production. However, achieving such alignment can be difficult.

Various tools have traditionally been used to align tubing strings with respect to casing strings. However, the tools often require substantial rotation (e.g., more than 180°) of the tubing string from the surface to align the tubing string properly. Achieving proper alignment with substantial rotation of the tubing strings can be difficult in some applications (e.g., at depths greater than 10,000 feet, deviated or extended reach well geometry, etc.). Additionally, substantial rotation of the tubing strings may damage components of the tubing strings. For example, a tubing string can include one or more control lines that provide a medium for communication, power, and other services in the bore. Substantially rotating a portion of the tubing string that includes one or more control lines can cause stress on the control lines, which may result in the control lines breaking.

BRIEF DESCRIPTION OF THE DRAWINGS

These drawings illustrate certain aspects of some of the embodiments of the present disclosure and should not be used to limit or define the method.

FIGS. 5A-5B illustrate respective cross-sectional views of a latching key and key profile with the latching assembly in proper and improper alignment with the latch coupling, in accordance with some embodiments of the present disclosure.

FIGS. 6A-6M illustrate respective side views of the alignment and coupling process for the latch assembly and the latch coupling, in accordance with some embodiments of the present disclosure.

DETAILED DESCRIPTION

Disclosed herein are systems and methods for orienting a tubing string with respect to a downhole tubular (e.g., casing string, etc.). Example embodiments may include a latch assembly for the tubing string that interfaces with a latch coupling of a downhole tubular to orient and couple the tubing string with respect to the downhole tubular. In particular, the latch assembly may interface with the latch coupling and/or rotational guides to align a tubing string window with a corresponding downhole tubular window at a junction of a multilateral wellbore. The latch assembly, the latch coupling, and/or the rotational guides may be configured to orient and secure the tubing string to the downhole tubular with minimal rotation of the tubing string (e.g., rotation less than 722°, or 360° or 180°) to increase ease of use and efficiency in securing the tubing string, as well as to minimize risk in damaging components of the tubing string (e.g., a control line) that may occur during substantial rotation of the tubing string.

Similarly, the systems and methods disclosed herein may be used to orient other strings and/or components with respect to a casing or other tubular string. For example, a work string used to convey other tools into a wellbore may benefit. In one example, a tool known as a whipstock may be utilized to deflect another tool, such as a mill, into the side of a downhole tubular so that a window (e.g., downhole tubular window or hole) can be created so another wellbore may be drilled. After drilling the wellbore, the whipstock may be retrieved before or after another tubing string is run. The tubing string may be one used as described above (e.g., aligning a tubing window axially and rotationally with a casing window) or for other purposes such as extending out into a lateral wellbore to aid in the production of hydrocarbons.

The systems and methods disclosed within are not solely directed at a latch coupling of a downhole tubular. The latch coupling may be a part of a liner; a liner is a downhole tubular that does not extend back to the wellhead but is hung from another downhole tubular. In other instances, the latch coupling may be utilized with an anchor, anchor-packer, or other device(s) that secures itself to another string or load-bearing structure or foundation.

Figure 1:
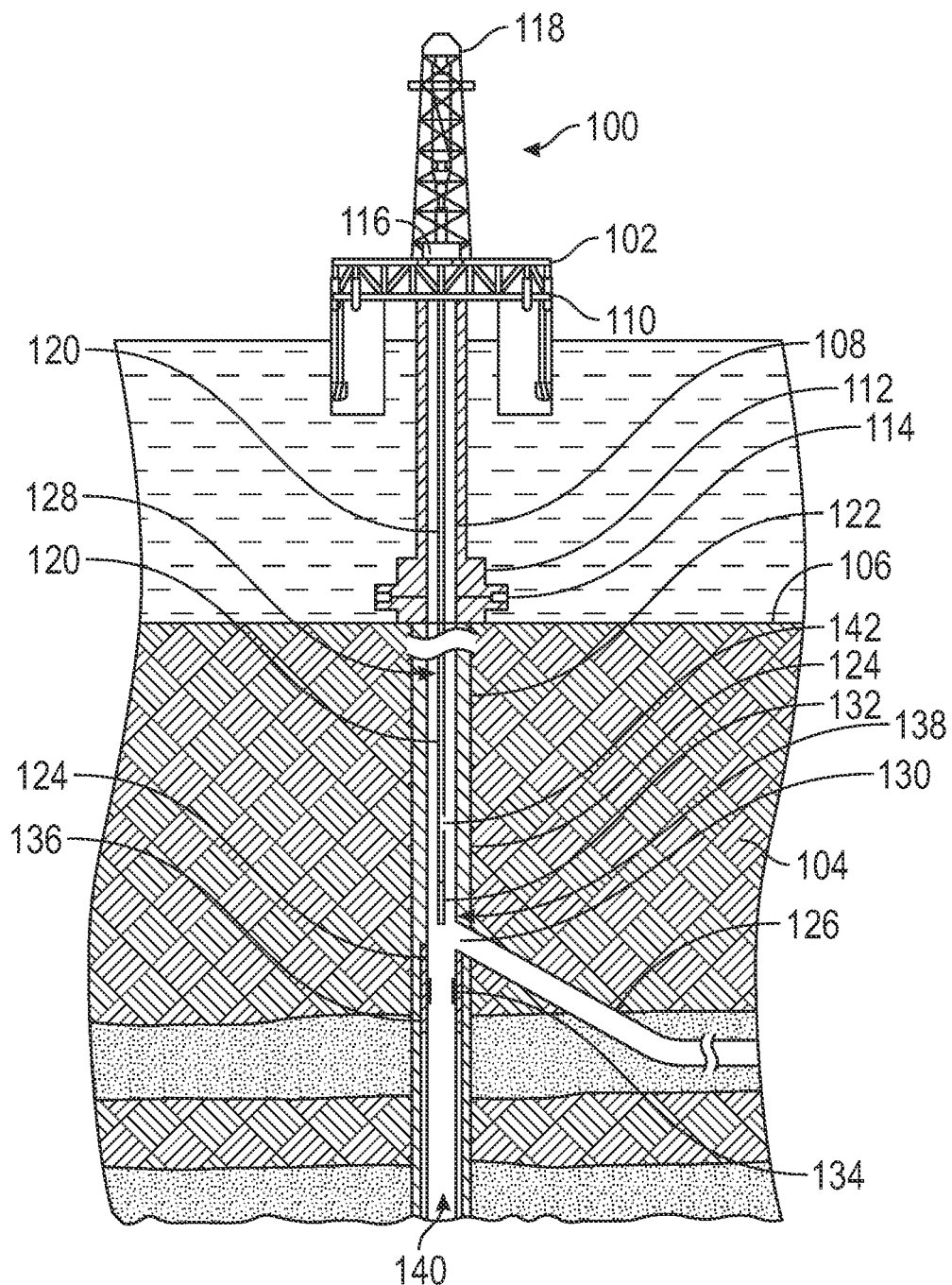
FIG. 1 illustrates an elevation view of a well system, in accordance with some embodiments of the present disclosure.

FIG. 1 illustrates an elevation view of a well system, in accordance with some embodiments of the present disclosure. As illustrated, the well system may comprise an offshore oil and gas system 100. The offshore oil and gas system 100 includes a platform 102, which may be a semi-submersible platform, positioned over a subterranean formation 104, containing hydrocarbons, located below the sea floor 106. A subsea conduit 108 extends from the deck 110 of the platform 102 to a wellhead installation 112 including one or more blowout preventers 114. The platform 102 has a hoisting apparatus 116 and a derrick 118 for raising and lowering conveyances 120 (e.g., a tubing string) and/or other downhole tools. Although an offshore oil and gas platform 102 is illustrated in FIG. 1, the scope of this disclosure is not thereby limited. The teachings of this disclosure may also be applied to other offshore oil and gas systems or land-based oil and gas systems.

As illustrated, a main wellbore 122 of a multilateral wellbore 128 has been drilled through the various earth strata, including the subterranean formation 104. The term "main wellbore," or "parent wellbore," is used herein to designate a borehole from which another wellbore is drilled. A downhole tubular 124 may provide support against collapse of the subterranean formation 104 surrounding main wellbore 122. In some examples, the downhole tubular 124 may be at least partially cemented within wellbore 122. The term "casing" is used herein to designate a tubular string used to line a wellbore. Casing may actually be of the type known to those skilled in the art as "liner" and may be made of any material, such as steel or composite material and may be segmented or continuous, such as coiled tubing. As illustrated, the downhole tubular 124 may be milled at a desired location to form a downhole tubular window 130 for a lateral wellbore 126. The term "lateral" wellbore is used herein to designate a wellbore that is drilled outwardly from its intersection with another wellbore (e.g., a main bore) such that the trajectory of the wellbore is roughly parallel to the surface of the earth. Moreover, the lateral wellbore 126 may have another lateral wellbore drilled outwardly therefrom.

As set forth in greater detail below, a latch assembly 132 may be securable to the conveyance 120. In particular, the latch assembly 132 may be secured to a downhole end of the conveyance 120. The latch assembly 132 is configured to interface with a corresponding latch coupling 134 formed in an inner surface 136 of the downhole tubular 124, which may be disposed proximate a junction 138 of the multilateral wellbore 128. Generally, the conveyance 120 may be configured to lower the latch assembly 132 into a central bore 140 of the downhole tubular 124 such that the latch assembly 132 may interface with the latch coupling 134. As set forth in FIG. 5A, the latch assembly 132 may be configured to couple to the latch coupling 134 in response to the latch assembly 132 interfacing with the latch coupling 134 in a proper orientation. In response to the latch assembly 132 being improperly oriented with respect to the latch coupling 134, the latch assembly 132 may be configured to pass by the latch coupling 134 as set forth below in FIG. 5B.

However, with the latch assembly 132 properly oriented and coupled to the latch coupling 134, a tubing string window 142 of the conveyance 120 may be angularly and axially aligned with the corresponding downhole tubular window 130 of the downhole tubular 124. Further, as set forth above, the latch coupling 134 may be disposed proximate the junction 138 of the multilateral wellbore 128. As such, angularly and axially aligning the tubing string window 142 and the downhole tubular window 130 may open a pathway connecting the main wellbore 122 with the lateral wellbore 126 of the multilateral wellbore 128.

Figure 2:
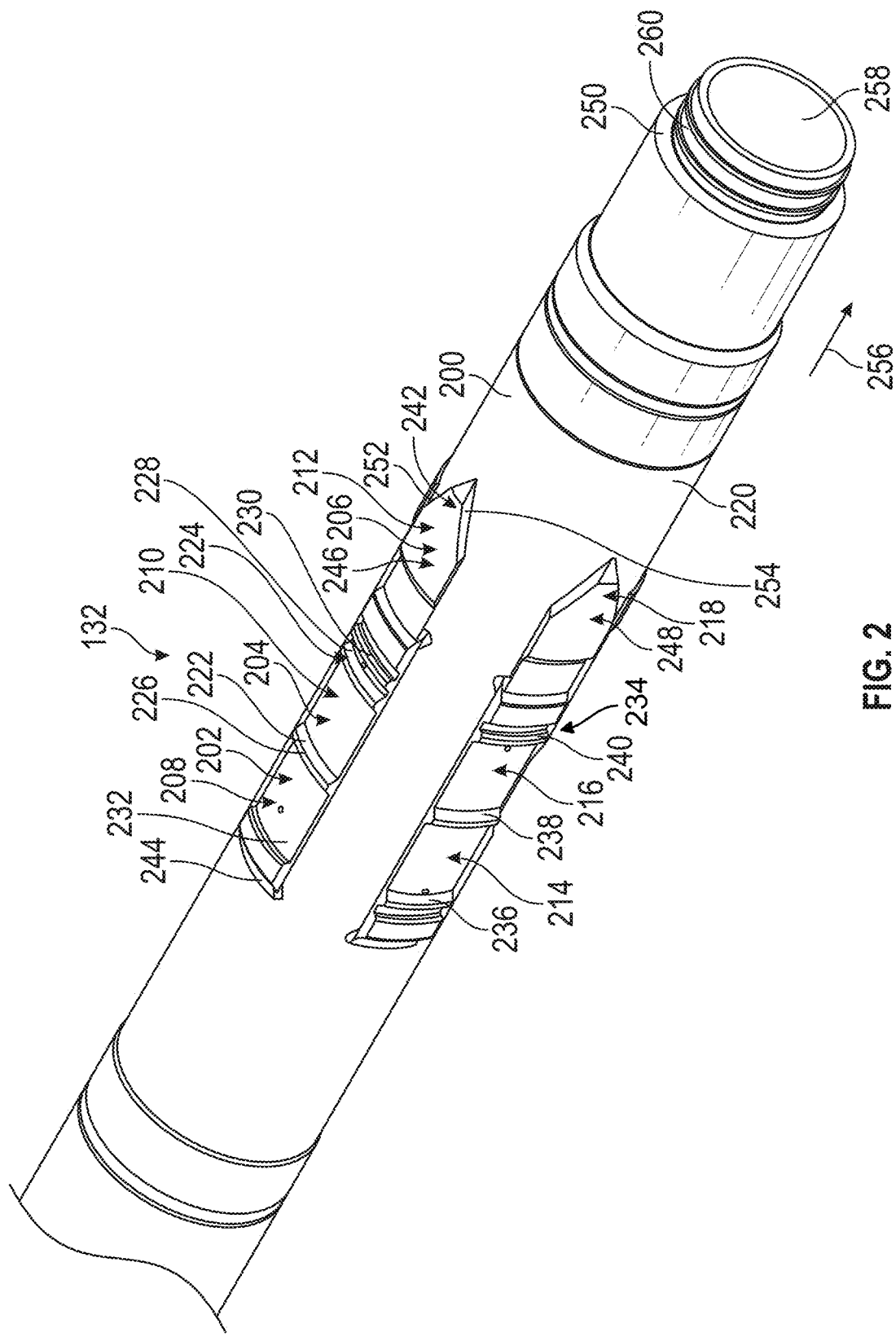
FIG. 2 illustrates a perspective view of a latch assembly for a tubing string, in accordance with some embodiments of the present disclosure.

FIG. 2 illustrates a perspective view of a latch assembly for a tubing string, in accordance with some embodiments of the present disclosure. The latch assembly 132 includes a tubular body portion 200 and a plurality of latch features 202 (e.g., latch keys 204, alignment features 206, etc.) secured to the tubular body portion 200. The latch features 202 may include the latch keys 204 secured to the tubular body portion 200 separate from the alignment features 206. Alternatively, as illustrated, each latch feature 202 may include a latch key 204 connected to a corresponding alignment feature 206. For example, the latch assembly 132 may include a first latch feature 208 having a first latch key 210 and a first alignment feature 212, a second latch feature 214 having a second latch key 216 and a second alignment feature 218, a third latch feature 656 having a third latch key and a third alignment feature (shown in FIG. 6), a fourth latch feature having a fourth latch key and a fourth alignment feature (shown in FIG. 6). However, the plurality of latch features 202 may include any number of latch features 202. Moreover, the latch keys 204 of the plurality of latch keys 204 may be spaced equally apart about a circumference of an outer surface 220 of the tubular body portion 200 of the latch assembly 132.

Further, each latch key 204 may include a key configuration (e.g., shape) formed in a radially outer surface of each respective latch key 204. As set forth in greater detail below, each key configuration may correspond to a shape of at least one key profile of the plurality of key profiles (shown in FIG. 3) of the latch coupling 134. Further, at least one latch key 204 of the plurality of latch keys 204 includes a unique key configuration. However, each latch key 204 of the plurality of latch keys 204 may have a unique key configuration. Each key configuration may include at least one respective interface feature 222, which may include at least one protrusion, recess, or some combination thereof, (e.g., ridges, bumps, slots, holes, etc.). For example, the first latch key 210 of the first latch feature 208 may comprise a first group of ridges 224 (e.g., a first key ridge 226, a second key ridge 228, and a third key ridge 230) protruding radially outward from a radially outer surface 232 of the first latch feature 208 and extending circumferentially across the first latch feature 208. As illustrated, two of the ridges of the first latch key 210 (e.g., the second key ridge 228 and the third key ridge 230) may be disposed proximately to each other and the first key ridge 226 may be spaced farther apart from the other two ridges. Further, the second latch key 216 of the second latch feature 214 may comprise a second group of ridges 234 having ridges (e.g., a fourth key ridge 236, a fifth key ridge 238, and a sixth key ridge 240) that are spaced apart differently than the ridges of the first latch key 210 such that the second latch key 216 is unique with respect to the first latch key 210. For example, the ridges of the second group of ridges 234 may be spaced apart evenly along an axial length of the second latch feature 214.

Additionally, the latch keys 204 may have similar or different profiles, shapes, physical properties, features from one another or from other features (e.g., torque keys shown in FIG. 7) of the latch assembly. For example, the latch keys 204 may have tapered ends, torque shoulders, angled sides, rotational guides to compliment other features such as those illustrated in FIGS. 3, 6A-6M, and 8 (e.g., rotational guides, angled sides, angled guides surfaces, alignment features, ridges, flats, reliefs, etc.) and other features not shown.

Moreover, the alignment features 206 may include at least one lower alignment feature 242 and at least one upper alignment feature 244. The at least one lower alignment feature 242 may include a first lower alignment feature 246, a second lower alignment feature 248, etc., which may be formed in a downhole end of each respective latch feature. That is, each lower alignment feature 206 may be disposed between a downhole end (e.g., lower end) of the latch assembly 132 and a corresponding latch key 204. For example, the first lower alignment feature 246 may be disposed between a first latch key 210 and a downhole end 250 of the latch assembly 132. However, the lower alignment features 206 may be disposed in any suitable position and/or orientation with respect to the latch assembly 132. Further, each lower alignment feature 206 may comprise a wedge-shaped geometry having a first wedge side 252 and a second wedge side 254. As set forth in greater detail below, either the first wedge side 252 or the second wedge side 254 may be configured to contact a corresponding surface of at least one upper guide feature (shown in FIG. 3) to orient the latch assembly 132 with respect to the latch coupling 134 as the conveyance 120 moves the latch assembly 132 in the downhole direction 256.

Moreover, the latch assembly 132 may comprise a sealed through bore 258 which isolates other components from the materials that flow through an interior region of the latch assembly 132. The sealed through bore 258 may comprise a tube with sealing connectors 260 at each end so that corrosive fluids (e.g., hydrocarbons, H2S fluids, C02 fluids, acids, bases, etc.), contaminants (e.g., sand, debris, paraffins, asphaltenes, etc.), high-temperature fluids (fluids from geothermal formations, injected fluids, etc.), cryogenic fluids, or some combination thereof, may pass by the latch assembly 132 without degrading the latch assembly 132 or other components such as springs, keys, wear-resistant devices, coatings, barriers, seals, electronics, sensors, detectors, tubes, electrical wires, insulators, and/or other suitable components of the latch assembly 132.

Figure 3:
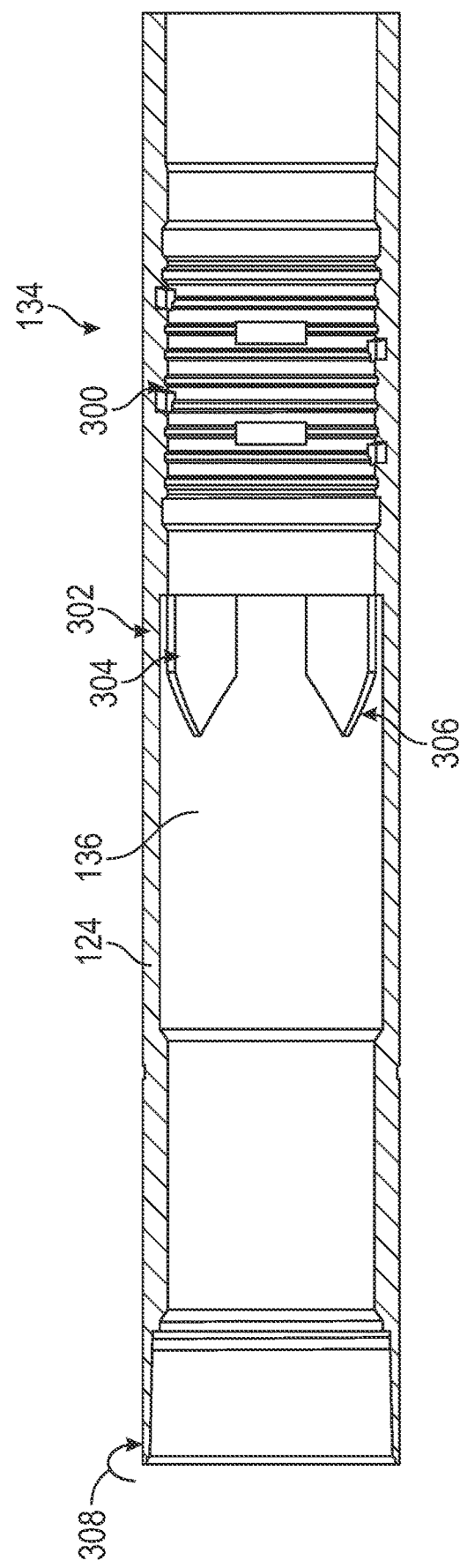
FIG. 3 illustrates a cross-sectional side view of a casing having a latch coupling and upper guide features, in accordance with some embodiments of the present disclosure.

FIG. 3 illustrates a cross-sectional side view of a downhole tubular having a latch coupling and upper guide features, in accordance with some embodiments of the present disclosure. As illustrated, the latch coupling 134 may have a plurality of key profiles 300 formed on the inner surface 136 of the downhole tubular 124. Further, at least one guide feature 302 (e.g., upper guide features 304, lower guide features, etc.) may be secured to the inner surface 136 of the downhole tubular 124. The at least one guide feature 302 is configured to rotate the latch assembly 132 to angularly align the plurality of latch keys 204 with the plurality of key profiles 300 in response to contact with the at least one alignment feature 206 (shown in FIG. 6C). In particular, the at least one guide feature 302 may include a plurality of upper guide features 304 (e.g., muleshoes helixes, etc.) disposed uphole from the plurality of key profiles 300. Each upper guide feature 304 may extend radially inward from the inner surface 136 of the downhole tubular 124. Additionally, the at least one guide feature 302 may extend along the inner surface 136 in an axial direction. That is, the at least one guide feature 302 may be straight. Alternatively, the at least one guide feature 302 may include a helical shape configured to rotate the latch assembly in response to contact between the latch assembly 132 and the at least one guide feature 302 as the latch assembly 132 moves axially with respect to the at least one guide feature 302.

Moreover, as illustrated, an uphole end 306 of each upper guide feature 304 may include a wedge shaped geometry configured to interface with a corresponding lower alignment feature 206 of the latch assembly 132 to rotate the latch assembly 132 (shown in FIG. 6B). That is, contact between the wedge shaped geometry of the upper guide feature 304 and a lower wedge face of the at least one lower alignment feature 242 may drive rotation of the latch assembly 132 in a first direction (e.g., clockwise direction 308) to angularly align the plurality of latch keys 204 with the plurality of key profiles 300 as the latch assembly 132 moves axially in the downhole direction 256.

The plurality of key profiles 300 may have protrusions, recesses, and/or other suitable feature for interfacing with corresponding latch keys 204 of the latch assembly 132 (shown in FIG. 2). Indeed, the plurality of latch keys 204 are configured to engage corresponding key profiles of the plurality of key profiles 300 to restrain axial movement (shown in FIG. 5A) and rotational movement of the latch assembly 132 with respect to the downhole tubular 124. However, as set forth in greater detail below, the plurality of latch keys 204 are only configured to engage corresponding key profiles of the plurality of key profiles 300 in response to proper angular orientation of the latch assembly 132 with respect to the latch coupling 134 as the latch assembly 132 is axially aligned with the latch coupling 134. In the proper orientation, the latch keys 204 may be configured to extend radially outward into the key profiles 300 such that contact between circumferential surfaces of the latch keys 204 and the key profiles 300 may restrain rotational movement and contact between axial surfaces of the latch keys 204 and the key profiles 300 may restrain axial movement of the latch assembly 132 with respect to the downhole tubular 124. Moreover, the latch assembly 132 may be configured to pass through the latch coupling 134 without engaging the key profiles 300 in response to improper orientation of the latch assembly 132 with respect to the latch coupling 134.

Figure 4:
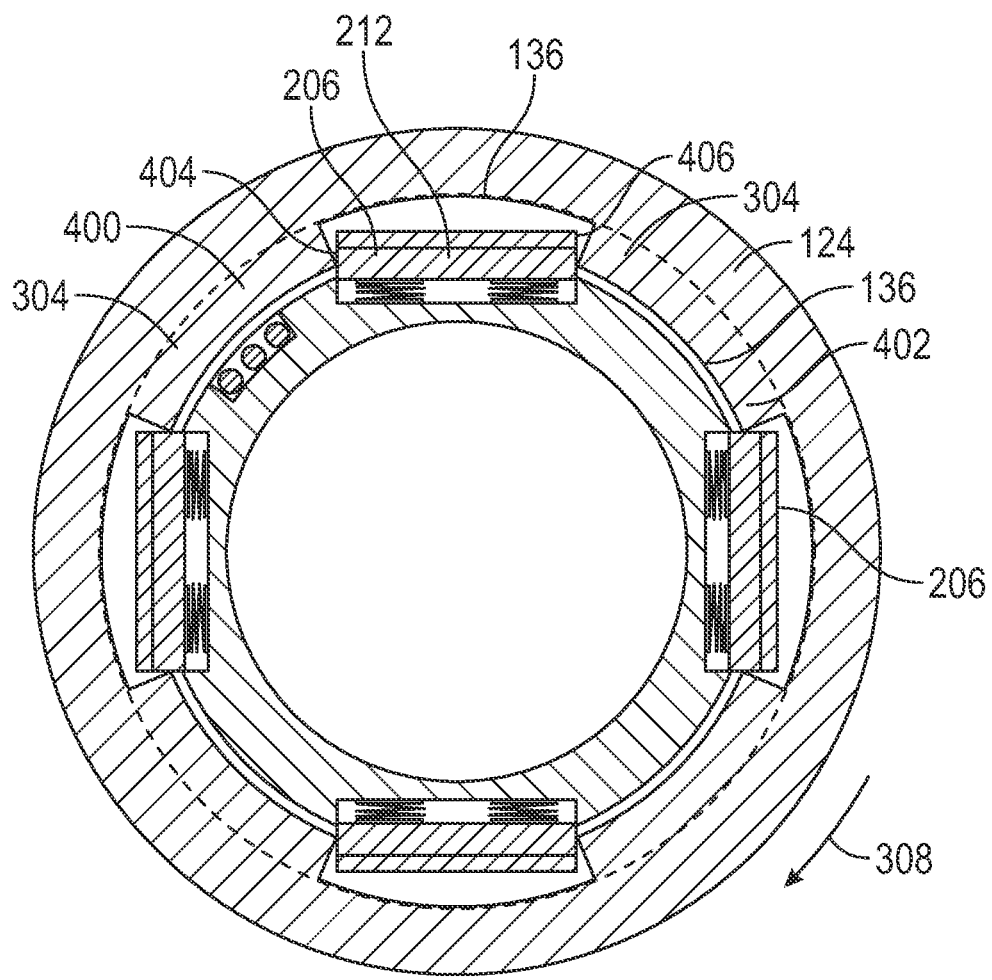
FIG. 4 illustrates a cross-sectional view of latch features of the latch assembly interfacing with upper guide feature features, in accordance with some embodiments of the present disclosure.

FIG. 4 illustrates a cross-sectional view of latch features of the latch assembly interfacing with upper guide features, in accordance with some embodiments of the present disclosure. The upper guide features 304 extend radially inward from the inner surface 136 of the downhole tubular 124. As illustrated, the upper guide features 304 may be formed as part of the downhole tubular 124. Alternatively, the upper guide features 304 may be secured to the inner surface 136 of the downhole tubular 124. As set forth above, the upper guide features 304 are configured to rotate the latch assembly 132 in a first direction (e.g., a clockwise direction 308) to angularly align the plurality of latch keys 204 with the plurality of key profiles 300 in response to contact with corresponding alignment features 206. As illustrated, each alignment feature 206 of the latch assembly 132 may rotate with the latch assembly 132 to a circumferential position disposed between adjacent upper guide features 304. Contact between the alignment features 206 and the respective upper guide features 304 may maintain alignment of the latch keys 204 with respect to the key profiles 300 as the latch assembly moves axially downhole toward the key profiles 300 of the latch coupling 134 (shown in FIG. 5A).

For example, a first alignment feature 212 may rotate to a circumferential position between a first upper guide feature 400 and a second upper guide feature 402. Contact between a first sidewall 404 of the first alignment feature 212 and the first upper guide feature 400 may restrain counterclockwise rotation of the first alignment feature 212 with respect to the downhole tubular 124, which may also restrain rotation of the latch assembly 132 with respect to the downhole tubular 124 due to the interface between the first alignment feature 212 and the latch assembly 132. Further, contact between a second sidewall 406 of the first alignment feature 212 and the second upper guide feature 402 may restrain clockwise rotation of the first alignment feature 212 with respect to the downhole tubular 124.

FIGS. 5A-5B illustrate respective cross-sectional views of a latching key and key profile with the latching assembly in proper and improper alignment with the latch coupling, in accordance with some embodiments of the present disclosure. In particular, FIG. 5A illustrates a first latch key 210 of the plurality of latch keys 204 engaged with a first key profile 530 of the plurality of key profiles 300. The latch assembly 132 may include at least one actuator 502 configured to bias at least one latch key of the plurality of latch keys 204 in a radially outward direction with respect to the tubular body portion 200. For example, the at least one actuator 502 may include at least one spring assembly 504 disposed between at least one latch key of the plurality of latch keys 204 and the outer surface 220 of the tubular body portion 200 of the latch assembly 132. Alternatively, the at least one actuator 502 may include a hydraulic actuator or any suitable actuator for biasing the at least one latch key of the plurality of latch keys 204 in a radially outward direction with respect to the tubular body portion 200.

As illustrated, the latch assembly 132 may include a first actuator 506 (e.g., a first spring assembly) configured to bias the first latch key 210 in a radially outward direction with respect to the latch assembly 132. The tubular body portion 200 of the latch assembly 132 may include at least one key recess 508 (e.g., a first key recess 510) formed in the outer surface 220 of the tubular body portion 200. The first key recess 510 may be configured to house the first actuator 506 as well as at least a portion of the first latch key 210. As illustrated, the first key recess 510 may include an upper lip 512 and a lower lip 514 configured to engage the respective upper end 516 and lower end 518 of the first latch key 210 to retain the first latch key 210 at least partially within the first key recess 510 and prevent the first latch key 210 from ejecting from the first key recess 510. The first spring assembly 504 may be disposed between the outer surface 220 of the tubular body portion 200 within the first key recess 510 and a radially inner surface 520 of the first latch key 210. As illustrated, the first spring assembly 504 may include a plurality of springs 522 (e.g., a first spring 524, a second spring 526, etc.) each disposed between the outer surface of the tubular body portion 200 within the first key recess 510 and a radially inner surface 520 of the first latch key 210. The spring assembly 504 may include any suitable number of springs 522.

Further, the first latch key 210 may include a key configuration having at least one respective interface feature 222 (e.g., ridge, bump, slot, hole, etc.) formed on a radially outer surface 527 of the first latch key 210. For example, the first latch key 210 may include the first key ridge 226, the second key ridge 228, and the third key ridge 230 protruding radially outward from the radially outer surface 527 of the first latch key 210. As illustrated, the interface features 222 may be spaced apart unevenly along an axial length of the first latch key 210 with the second key ridge 228 disposed closer to the third key ridge 230 than the first key ridge 226. However, the interface features 222 may be disposed in any suitable positions along the axial length of the first latch key 210. Additionally, the plurality of latch keys 204 may include at least one latch key 204 having a unique key configuration. For example, the first latch key 210 (e.g., a first unique latch key) may have a unique key configuration with respect to the remaining latch keys of the plurality of latch keys 204. The first unique latch key 204 may be configured to only engage a corresponding first unique key profile 528 of the latch coupling 134 to restrain axial and rotational movement of the latch assembly 132 with respect to the downhole tubular 124.

Moreover, as set forth above, the latch coupling 134 may include the plurality of key profiles 300 formed in the inner surface 136 of the downhole tubular 124. The plurality of key profiles 300 may have protrusions, recesses, and/or other suitable features for interfacing with corresponding latch keys 204 of the latch assembly 132. For example, as illustrated, the plurality of key profiles 300 may include a first key profile 530 (e.g., the first unique key profile 528) configured to interface with the first latch key 210. In particular, the first key profile 530 may include a first recess 532 corresponding to the first key ridge 226 of the first latch key 210, a second recess 534 corresponding to the second key ridge 228, and a third recess 536 corresponding to the third key ridge 230. The first recess 532, the second recess 534, and the third recess 536 may be positioned such that the each of the ridges (e.g., the first key ridge 226, the second key ridge 228, and the third key ridge 230) may axially align with each of the corresponding recesses (e.g., the first recess 532, the second recess 534, and the third recess 536) in response to axial alignment of the latch assembly 132 with respect to the latch coupling 134. Having each of the ridges axially and circumferentially aligned with the corresponding recesses may permit the first actuator 506 to drive the first latch key 210 radially outward such that each of the ridges of the first latch key 210 are driven into the corresponding recesses of the first key profile 530. That is, the ridges of the first latch key 210 may engage the corresponding recesses of the first key profile 530 such that contact between the ridges and the corresponding recesses may restrain axial and rotational movement of the latch assembly with respect to the downhole tubular 124.

Additionally, as illustrated, the first key profile 530 may include at least one support recess 538 configured to receive at least one support protrusion 540 of the first latch key 210. An interface between the at least one support protrusion 540 and the at least one support recess 538 may reduce forces on the respective interface features of the first key profile 530.

FIG. 5B illustrates a first latch key of the plurality of latch keys aligned with a second key profile of the plurality of keys profiles. As set forth above, the plurality of latch keys 204 may include at least one latch key 204 having a unique key configuration. Indeed, each latch key 204 of the plurality of latch keys 204 may have a unique key configuration corresponding to a respective key profile 300 of the plurality of key profiles 300 of the latch coupling 134. For example, the first latch key 210 may include a first key configuration configured to only engage the first key profile 530 (shown in FIG. 5A), the second latch key 216 may include a second key configuration configured to only engage a second key profile 542, etc.

As illustrated, the first latch key 210 may be circumferentially and axially aligned with the second key profile 542. However, the first latch key 210 includes the first key configuration, which does not correspond with the second key profile 542. As such, the first latch key 210 is configured to not engage the second key profile 542 as the latch assembly 132 moves through the latch coupling 134. Further, without the first latch coupling 134 engaging the first key profile 530 to restrain axial and/or rotational movement of the latch assembly 132 with respect to the downhole tubular 124, the latch assembly 132 may continue to move axially through the latch coupling 134. That is, in response to the first unique latch key 204 being angularly offset from the first unique key profile 528.

For example, the first latch key 210 may include the first key ridge 226, the second key ridge 228, and the third key ridge 230 protruding radially outward from the radially outer surface of the first latch key 210. The second key profile 542 may include a fourth recess 544, a fifth recess 546, and a sixth recess 548. As illustrated, the first key ridge 226 may be axially aligned with the fourth recess 544 and the third key ridge 230 may be axially aligned with the sixth recess 548. However, the second key ridge 228 may be axially offset from the fifth recess 546 such that the second key ridge 228 interfaces with the inner surface 136 of the downhole tubular 124 with the latch assembly 132 axially aligned with the latch coupling 134. Such interface between the second key ridge 228 and the inner surface 136 may drive the first latch key 210 radially inward toward the tubular body portion 200 of the latch assembly 132. In particular, the first latch key 210 may retract into the first key recess 510 such that the first latch key 210 may not engage the second key profile 542, which may permit the latch assembly 132 to continue to move axially through the latch coupling 134.

FIGS. 6A-6M illustrate respective side views of the alignment and coupling process for the latch assembly and the latch coupling, in accordance with some embodiments of the present disclosure. As shown, the downhole tubular and the latch coupling are partially transparent to help illustrate the alignment and coupling process. Moreover, as set forth in greater detail below in FIGS. 6A-6M, the latch assembly may be lowered into the downhole tubular, via the conveyance, to attempt to couple with the latch coupling. In response to proper alignment of the latch assembly with respect to the latch coupling, the latch assembly may engage the latch coupling to restrain axial and rotational movement of the latch assembly with respect to the downhole tubular. However, in response to improper alignment of the latch assembly with respect to the latch coupling, the latch assembly may continue to move through the latch coupling in the downhole direction toward the at least one lower deflector feature. The at least one lower deflector feature is configured to rotate the latch assembly in the first direction to index the plurality of latch keys with respect to the plurality of key profiles in response to contact with a corresponding alignment feature of the plurality of alignment features. After the latch assembly is indexed via the at least one lower deflector feature, the conveyance may pull the latch assembly in the uphole direction toward the at least one lower guide feature, which is disposed between the at least one lower deflector feature and the latch coupling. The at least one lower guide feature includes a lower guide face configured to contact a corresponding alignment feature of latch assembly to continue to rotate the latch assembly in the first direction to angularly align the indexed plurality of latch keys with the plurality of key profiles. The conveyance may continue to pull the latch assembly in the uphole direction and once again into axial alignment with the latch coupling. If the indexed latch assembly is properly aligned with the latch coupling, the latch assembly may engage the latch coupling to restrain axial and rotational movement of the latch assembly with respect to the downhole tubular.

However, if the indexed latch assembly is still improperly aligned with respect to the latch coupling, the indexing process may be repeated to further index the latch keys with respect to the key profiles. In particular, the conveyance may again lower the latch assembly into contact with the at least one lower deflector feature to further index the latch assembly, raise the latch assembly into the at least one lower guide feature to angularly align the indexed latch keys, and then raise the latch assembly once again into axial alignment with the latch coupling.

Figure 6A:
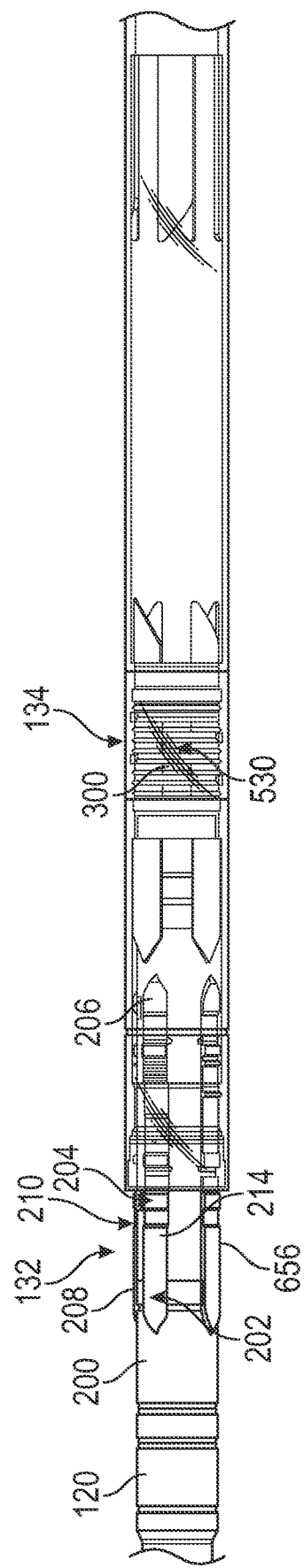

In particular, FIG. 6A discloses the latch assembly 132 being run-in-hole (e.g., lowered into the well) via the conveyance 120. As illustrated, the conveyance 120 may include a tubing string. However, the conveyance 120 may include any suitable conveyance. Moreover, as set forth above, the latch assembly 132 may include the plurality of latch features 202. For example, the latch assembly 132 may include the first latch feature 208, the second latch feature 214, the third latch feature 656, and the fourth latch feature (not shown). However, the plurality of latch features 202 may include any number of latch features 202. Further, as set forth above, each latch feature 202 may include a latch key 204 and/or at least one alignment feature 206 secured to the tubular body portion 200 of the latch assembly 132. Further, at least one latch feature 202 may include a unique latch key 204 having a unique key configuration configured to only engage with a corresponding unique key profile 300 of the latch coupling 134. For example, the first latch key 210 may include a unique key configuration configured to only engage the corresponding unique key profile of the first key profile 530.

FIG. 6B discloses at least one latch feature 202 of the latch assembly 132 contacting a corresponding upper guide feature 304 of the latch coupling 134. In particular, the at least one lower alignment feature 242 of the at least one latch feature 202 may contact the corresponding upper guide feature 304 of the latch coupling 134. The latch assembly 132 may be configured to rotate in response to the at least one latch feature 202 contacting the corresponding upper guide feature 304 as the latch assembly 132 moves in the axially downhole direction 256. For example, as illustrated, the second lower alignment feature 248 of the second latch feature 214 may contact the second upper guide feature 402. In particular, the first wedge side 252 of a lower wedge face 600 of the second lower alignment feature 248 may contact a corresponding angled guide surface 602 of the second upper guide feature 402 at an angled interface 604. The angled interface 604 may direct the latch assembly 132 to rotate in a first direction 606 (i.e., clockwise when looking down from the uphole end of the latch assembly 202) in response to the first wedge side 252 sliding along the corresponding angled guide surface 602 as the latch assembly 132 moves in the generally axially downhole direction 256. Rotating the latch assembly 132 in the first direction 606 may angularly align the plurality of latch keys 204 with the plurality of key profiles 300.

Figure 6C:
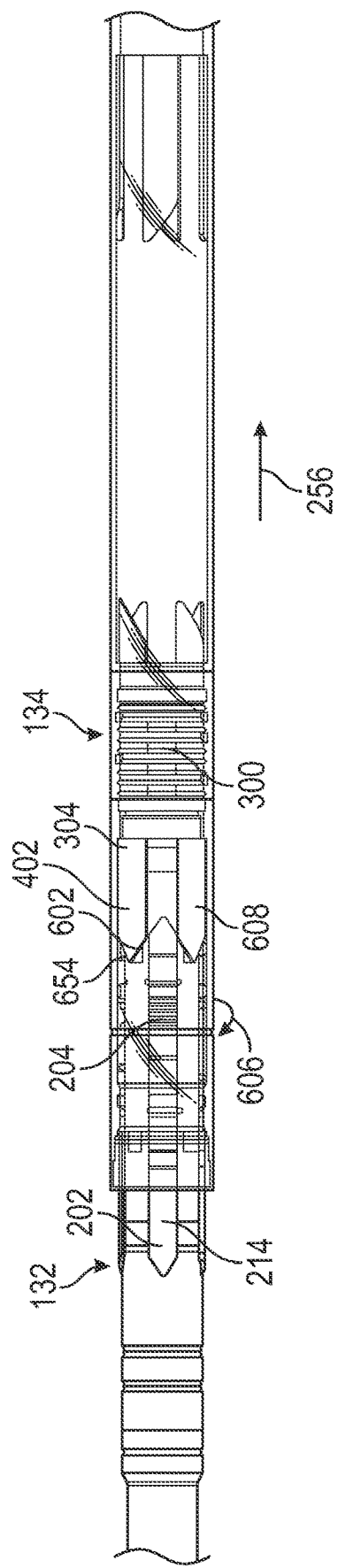

FIG. 6C discloses the latch assembly 132 in a rotated position. The latch keys 204 of the latch assembly 132 may be angularly aligned with corresponding key profiles 300 of the latch coupling 134 in the rotated position. Further, in the rotated position, the second latch feature 214 may be angularly positioned such that the second latch feature 214 may pass between the second upper guide feature 402 and a third upper guide feature 608 as the latch assembly moves in the downhole direction 256 toward the latch coupling 134.

Moreover, as set forth above, the latch assembly 132 may be configured to rotate in response to the upper guide feature 304 driving the at least one latch feature 202 to rotate as the latch assembly 132 moves in the axially downhole direction 256. As illustrated, the latch assembly 132 may rotate in a first direction 606 (e.g., a clockwise direction) with respect to the latch coupling 134 in response to the contact between the at least one latch feature 202 and a first angled guide surface 602 of the corresponding upper guide feature 304. Alternatively, the latch assembly 132 may rotate in a second direction (e.g., a counterclockwise direction) with respect to the latch coupling 134 in response to the contact between the at least one latch feature 202 and a second angled guide surface 654 of the corresponding upper guide feature 304.

Figure 6D:
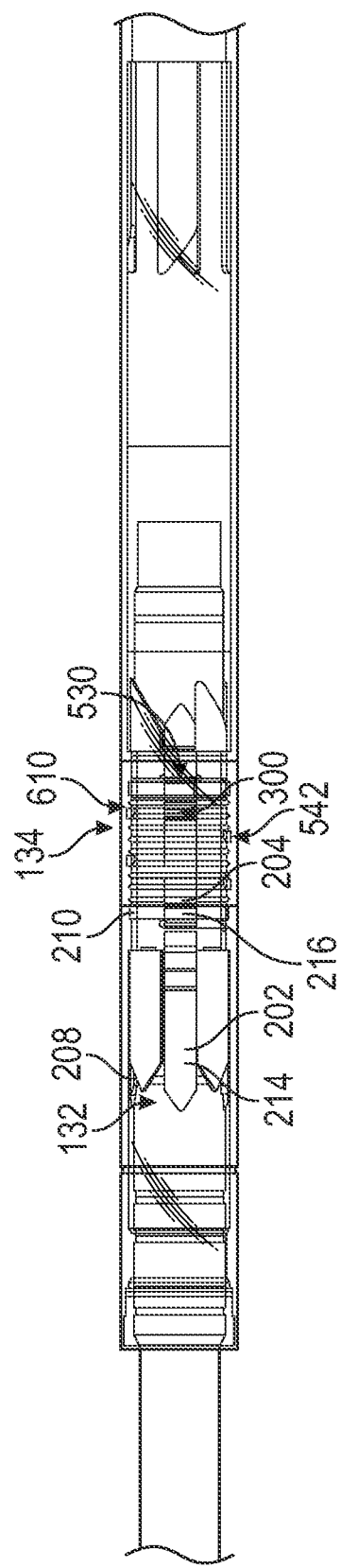

FIG. 6D discloses the latch assembly 132 positioned in axial alignment with the latch coupling 134. As set forth above, the latch assembly 132 may include at least one latch feature 202 comprising a respective latch key 204 that is configured to interface with a corresponding key profile 300 of the latch coupling 134. That is, at least one latch feature 202 may include a unique latch key 204 having a unique key configuration configured to only engage with a corresponding unique key profile 300 of the latch coupling 134. As such, if the latch assembly is properly oriented with respect to the latch coupling 134, then the latch key 204 (e.g., the first latch key 210, the second latch key 216, etc.) may engage and interface with the corresponding key profile 300, which may restrain axial movement of the latch assembly 132 with respect to the latch coupling 134. Further, having the at least one latch key 204 engage the corresponding key profile 300 may also restrain rotation of the latch assembly 132 with respect to the latch coupling 134 to hold the latch assembly 132 in the proper angular orientation with respect to the latch coupling 134.

As set forth above, the latch assembly 132 may include a plurality of latch features 202 (e.g., the first latch feature 208, the second latch feature 214, etc.) that each have unique latch keys 204. Further, the latch coupling 134 may include a plurality of key profiles 300 (e.g., recesses and/or protrusions formed in/on the inner surface of the casing) with each key profile 300 corresponding to a particular latch key 204 of the latch assembly 132. For example, the first latch key 210 may correspond to a first key profile 530, the second latch key 216 may correspond to a second key profile 542, etc. Moreover, as the latch assembly 132 moves downhole to the latch coupling 134, the first latch key 210 may engage the first key profile 530 if the first latch key 210 is angularly aligned with the first key profile 530, which may restrain axial and/or rotational movement of the latch assembly 132 with respect to the latch coupling 134. However, as illustrated, if the first latch key 210 is angularly aligned with another key profile 300 (e.g., a fourth key profile 610) as the latch assembly 132 moves downhole to the latch coupling 134, the first latch key 210 may not engage with the fourth key profile 610 such that the latch assembly 132 may continue to move axially with respect to the latch coupling 134.

Figure 6E:
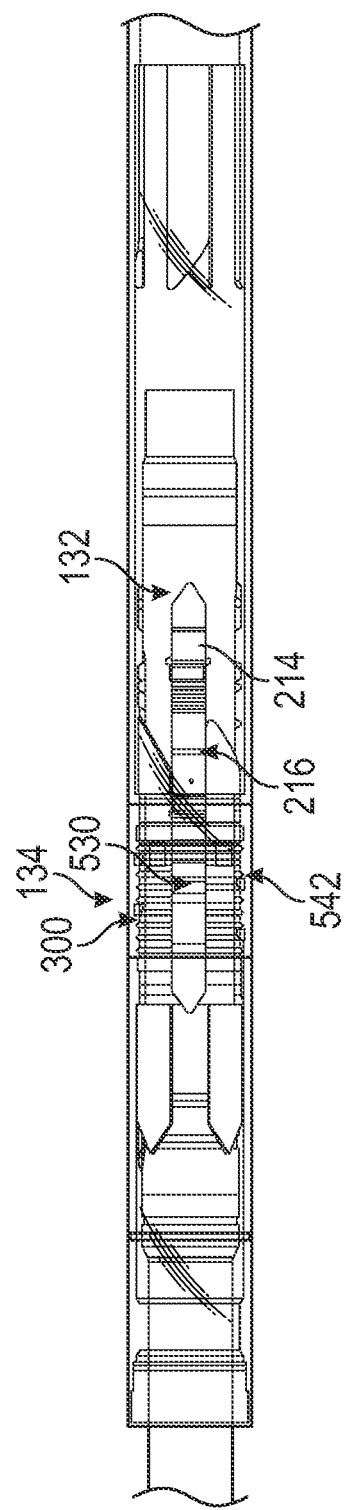

FIG. 6E discloses the latch assembly 132 passing through the latch coupling 134 in response to the latch assembly 132 being improperly aligned with respect to the latch coupling 134. As illustrated, the second latch key 216 of the second latch feature 214 is angularly aligned with another key profile 300 (e.g., the first key profile 530). As the second latch key 216 is configured to only engage the second key profile 542, the second latch key 216 may not engage the first key profile 530, and the latch assembly 132 may continue to move axially downhole with respect to the latch coupling 134.

Figure 6F:
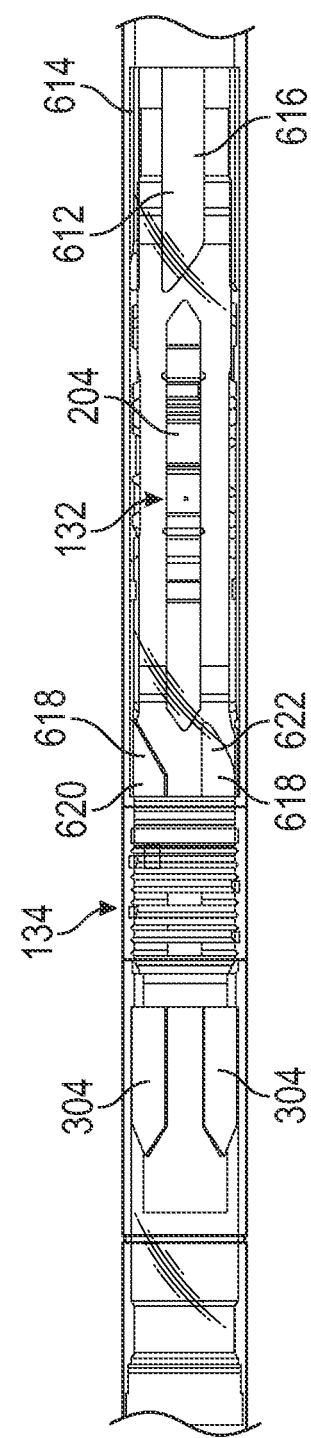

FIG. 6F discloses the latch assembly 132 moving axially downhole toward a lower deflector feature 612. The lower deflector feature 612 may comprise a plurality of lower deflector features 612 (e.g., a first deflector feature 614, a second deflector feature 616, etc.) that are disposed axially downhole from the latch coupling 134. As illustrated, each lower deflector feature 612 may be angularly offset from the upper guide features 304 and lower guide features 618. For example, for a system having four lower guide features, the lower guide features 618 may be offset from each other by ninety degrees such that a second lower guide feature 620 is disposed at zero degrees and a third lower guide feature 622 is disposed at ninety degrees. Further, the second deflector feature 616 may be disposed at forty-five degrees such that the second deflector feature 616 is disposed angularly between the second lower guide feature 620 and the third lower guide feature 622. However, the lower deflector features 612 may be disposed any suitable angular position.

As set forth in greater detail below, the lower deflector features 612 may be configured to rotate the latch assembly 132 to index the plurality of latch keys 204 in response to contact between the latch features 202 of the latch assembly 132 and the lower deflector features 612.

Figure 6G:
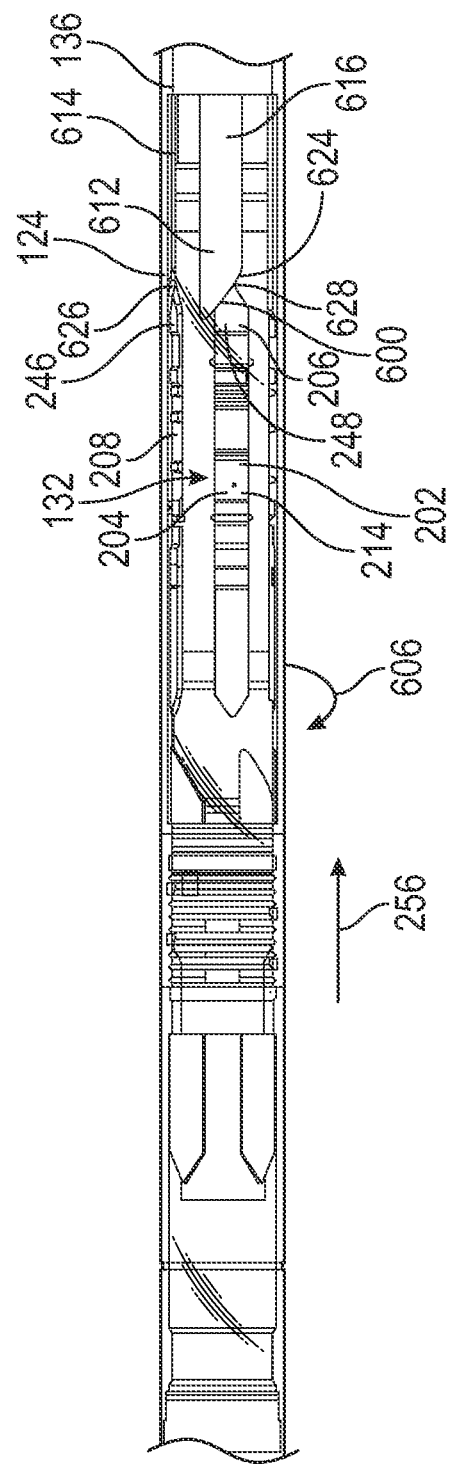

FIG. 6G discloses the latch assembly 132 rotating in response to contact with the lower deflector features 612. Specifically, the latch assembly 132 may rotate in response to contact between the latch features 202 of the latch assembly 132 and the lower deflector features 612. Each of the lower deflector features 612 (e.g., the first lower deflector feature 614, the second lower deflector feature 616, etc.) may be disposed downhole from the latch coupling 134 and may extend radially inward from the inner surface 136 of the downhole tubular 124. Further, each of the lower deflector features 612 may include an angled contact surface 624 configured to interface with respective lower wedge faces 600 of the lower alignment features 206 of the latch features 202.

For example, as illustrated, the first lower alignment feature 246 of the first latch feature 208 may be configured to contact a first angled contact surface 626 of the first lower deflector feature 614, and the second lower alignment feature 248 of the second latch feature 214 may be configured to contact a second angled contact surface 628 of the second deflector feature 616 as the latch assembly 132 moves in the downhole direction 256. Such contact between the respective alignment features 206 of the latch assembly 132 and the corresponding lower deflector features 612 may drive rotation of the latch assembly 132 as the latch assembly moves in the axially downhole direction 256. As illustrated, the latch assembly 132 may rotate in the first direction 606 (e.g., the counterclockwise direction) to index the plurality of latch keys 204 with respect to the plurality of key profiles in response to contact with the lower deflector features 612. Alternatively, the lower deflector features 612 may be configured to drive rotation of the latch assembly 132 in the second direction (e.g., the clockwise direction).

Figure 6H:
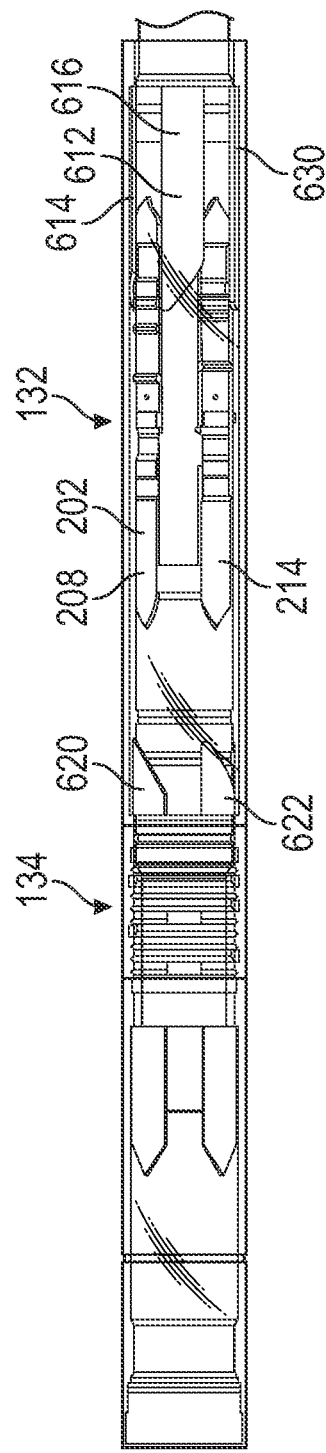

FIG. 6H discloses the latch assembly 132 in a rotated position in response to contact with the lower deflector features 612. As illustrated, first latch feature 208 is disposed between the first lower deflector feature 614 and the second deflector feature 616. Further, the second latch feature 214 is disposed between the second deflector feature 616 and a third deflector feature 630. The lower deflector features 612 may be configured to index the latch assembly 132 in response to improper alignment of the latch assembly 132 with the latch coupling 134. That is, the latch assembly 132 is only configured to interface with the lower deflector features 612 in response to the latch assembly 132 moving past the latch coupling 134 as a result of improper alignment of the latch assembly 132 with respect to the latch coupling 134.

For example, the lower deflector features 612 may be configured to rotate the latch assembly 132 to initiate an indexing of the plurality of latch features 202 of the latch assembly 132, such that the first latch feature 208 may be indexed from a position between a first lower guide feature and the second lower guide feature 620 to a position that is at least partially angularly aligned with the second lower guide feature 620. Further, the second latch feature 214 may be indexed from a position between the second lower guide feature 620 and the third lower guide feature 622 to a position that is at least partially angularly aligned with the third lower guide feature 622. As set forth in detail below, the lower guide features 618 are configured to contact the respective latch features 202 to finish indexing the latch features 202.

Figure 6I:
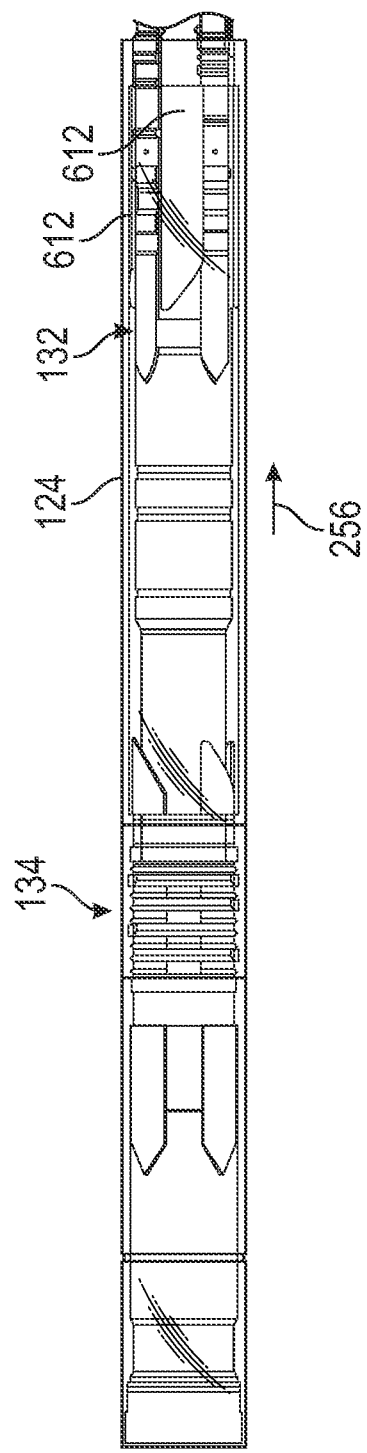

FIG. 6I discloses the latch assembly 132 moving in the axially downhole direction 256 through the lower deflector features 612. Indeed, the system may alternatively comprise a second latch coupling disposed at least partially downhole from the lower deflector features 612. With the latch assembly 132 rotated, the latch assembly 132 may be properly aligned respect to the second latch coupling such that the second latch coupling may be configured to secure the latch assembly 132 and retain the latch assembly 132 in proper orientation with respect to the downhole tubular 124. The second latch coupling may be disposed a few inches, a few feet, 10's of feet, hundreds of feet from the first latch coupling 134. For example, the second latch coupling may be between forty feet to one hundred and sixty feet from the first (upper) latch coupling 134. Generally, the window or other feature related to the second latch coupling may be generally aligned with the first latch coupling 134. For example, both a first window, milled in casing proximate the first latch coupling 134, and a second window, milled in casing proximate the second latch coupling, may be formed in a high-side of a wellbore (e.g., that is opposite the direction of gravity).

Figure 6J:
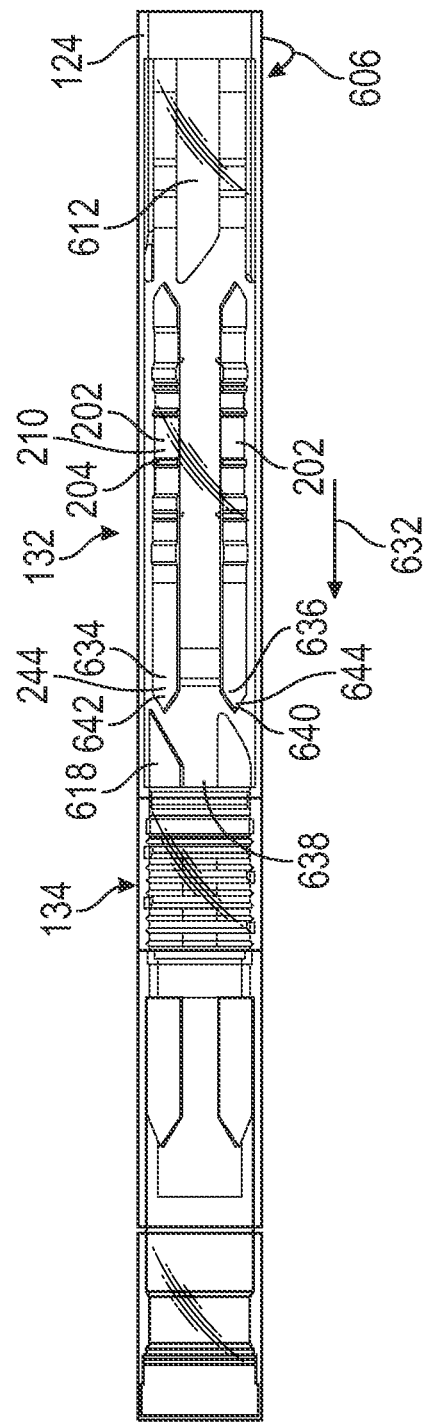

FIG. 6J discloses the latch assembly 132 moving in the axially uphole direction 632 after being rotated by the lower deflector features 612 in the first direction 606 to index the plurality of latch features 202. Indeed, the downhole tubular 124 may only include the first latch coupling 134 such that the latch assembly 132 may be driven uphole toward the first latch coupling 134 and at least one lower guide feature 618 after being rotated by the lower deflector features 612. The latch assembly 132 may include at least one upper alignment feature 244 configured to interface with the at least one lower guide feature 618 as the latch assembly 132 moves in the axially uphole direction 632 toward the first latch coupling 134.

The at least one upper alignment feature 244 may include a first upper alignment feature 634, a second upper alignment feature 636, etc., which may be formed in an uphole end of each respective latch feature 202. That is, each upper alignment feature 244 may be disposed between an uphole end 638 (e.g., upper end) of the latch assembly 132 and a corresponding latch key 204. For example, the first upper alignment feature 634 may be disposed between the first latch key 210 and an uphole end 638 of the latch assembly 132. However, the upper alignment feature 206 may be disposed in any suitable position and/or orientation with respect to the latch assembly 132. Further, each upper alignment feature 244 may comprise a respective upper wedge face 640 (e.g., a first upper wedge face 642, a second upper wedge face 644, etc.)

Figure 6K:
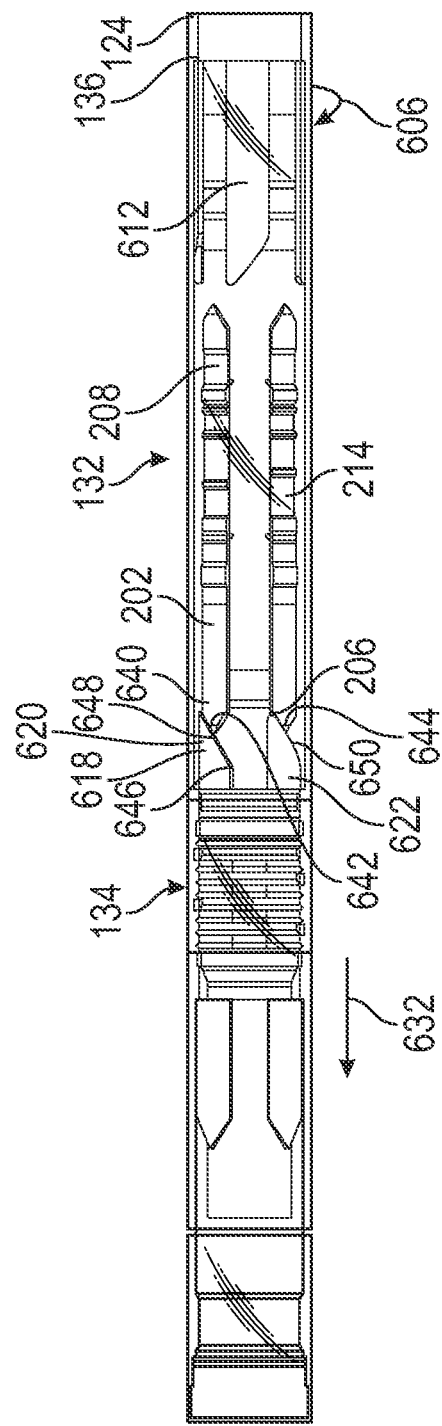

FIG. 6K discloses the at least one latch features 202 contacting respective lower guide features 618 in response to uphole movement of the latch assembly 132 from the lower deflector features 612. As set forth above, the lower deflector features 612 may rotate the latch assembly 132 in the first direction 606 to initiate indexing of the latch features 202 of the latch assembly 132. That is, the lower deflector features 612 may have rotated the first latch feature 208 to a position that is at least partially angularly aligned with the second lower guide feature 620, and the second latch feature 214 may have been rotated to a position that is at least partially angularly aligned with the third lower guide feature 622.

As illustrated, the lower guide features 618 may be configured to finish indexing the latch assembly 132. In particular, contact between the second lower guide feature 620 and the first latch feature 208 may drive rotation of the first latch feature 208 as the latch assembly 132 moves in the uphole direction 632, which may finish indexing the first latch feature 208 to a position between the second lower guide feature 620 and a third lower guide feature 622 (shown in FIG. 6L). Further, contact between the third lower guide feature 622 and the second latch feature 214 may drive rotation of the second latch feature 214 to a position between the third lower guide feature 622 and a fourth lower guide feature (not shown).

In particular, the lower guide features 618 may include respective lower guide faces 646 (e.g., a second lower guide face 648, a third lower guide face 650, etc.) configured to contact respective upper wedge faces 640 (e.g., the first upper wedge face 642, the second upper wedge face 644, etc.) of the upper alignment features 206 of the latch features 202. The lower guide faces 646 may be angled (e.g., tapered in the axial direction) such that contact with the upper wedge faces 640 may drive rotational movement of the latch assembly 132 in the first direction 606 as the latch assembly 132 moves in the axially uphole direction 632. Moreover, the lower guide features 618 (e.g., the second lower guide feature 620, the third lower guide feature 622, etc.) may extend radially inward from the inner surface 136 of the downhole tubular 124. Further, the lower guide features 618 may be positioned axially between the lower deflector features 612 and the latch coupling 134 (e.g., the first latch coupling).

Figure 6L:
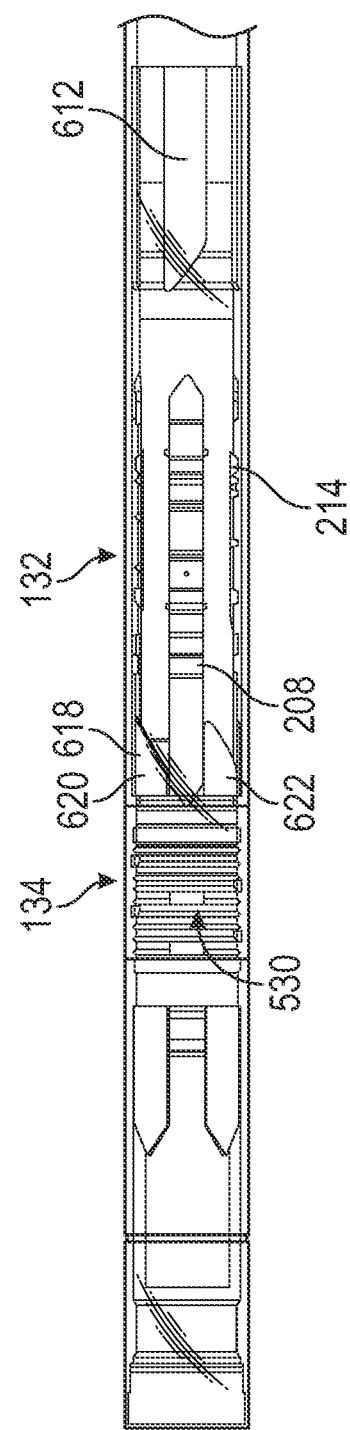

FIG. 6L discloses the latch assembly 132 in an indexed position. In particular, the first latch feature 208 of the latch assembly 132 may be indexed to a position between the second lower guide feature 620 and the third lower guide feature 622 such that the first latch feature 208 may be angularly aligned with the first key profile 530 of the latch coupling 134. Indeed, the indexing performed via contact of the latch assembly 132 with the lower deflector features 612 and the lower guide features 618 may index the first latch feature 208 from an initial angular position (e.g., angularly aligned with a fourth key profile 610 of the latch coupling 134 shown in FIG. 3) to a second indexed position that is angularly aligned with the first key profile 530 of the latch coupling 134. As illustrated, the remaining latch features of the latch assembly 132 (e.g., the second latch feature 214, etc.) may be similarly indexed.

Figure 6M:
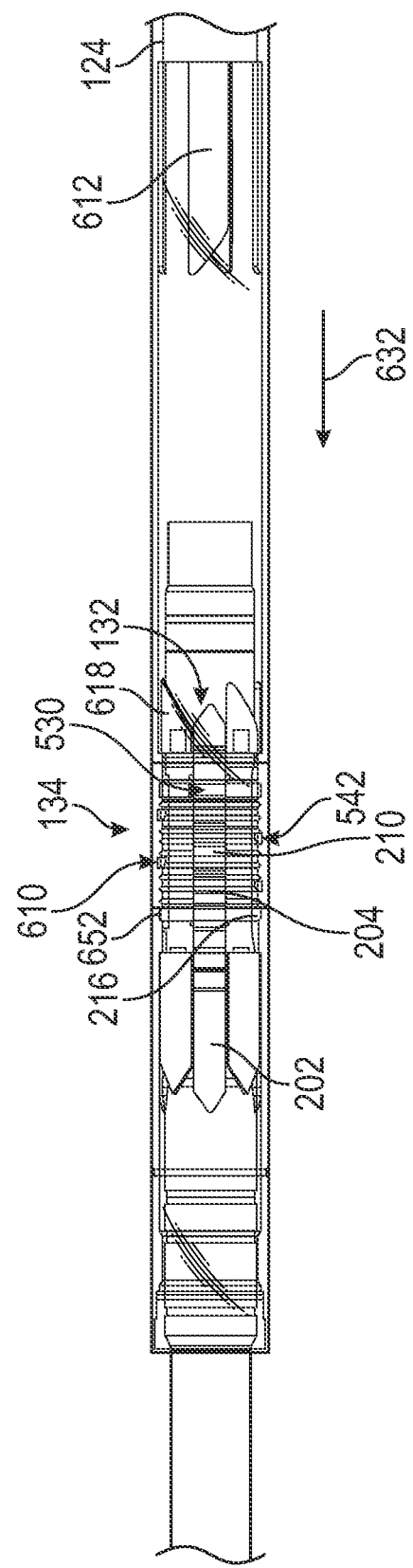

FIG. 6M discloses the latch assembly 132 secured to the latch coupling 134 in a locked position. After contacting the lower guide features 618 to finish indexing the plurality of latch features 202, the latch assembly 132 may continue to move in the uphole direction 632 to axially align the latch assembly 132 with the latch coupling 134 such that the indexed latch features 202 may again attempt to couple to the latch coupling 134. The latch assembly 132 may move directly into axial alignment to attempt to engage the latch coupling 134. Alternatively, the latch assembly 132 may be raised above the latch coupling 134 and then lowered into axially alignment with the latch coupling 134 to attempt to engage the latch coupling 134. As set forth above, the latch assembly 132 may only couple with the latch coupling 134 in the proper orientation. However, if the latch assembly 132 is not properly aligned, the latch assembly 132 may be further indexed by again moving the latch assembly 132 downhole into contact with the lower deflector features 612 and then pulling the latch assembly 132 uphole for another coupling attempt with the latch coupling 134.

As illustrated, the indexed latch assembly 132 is disposed in proper alignment with respect to the latch coupling 134. For example, the first latch key 210 may be indexed from the initial position to the second indexed position, which is angularly aligned with the first key profile 530. As set forth above, the first latch key 210 may include a unique key configuration configured to only engage the first key profile 530. Accordingly, with the first latch key 210 aligned with the first key profile 530, the first latch key 210 may expand radially outward to engage the first key profile 530, as shown in FIG. 5A, such that the latch assembly 132 may couple to the latch coupling 134. Further, in the proper orientation, the second latch key 216 may be configured to engage the second key profile 542, the third latch key may be configured to engage the third key profile (not shown), and a fourth latch key 652 may be configured to engage the fourth key profile 610, etc. Having the latch keys 204 engage with the corresponding key profiles 300 may secure or lock the latch assembly 132 to the latch coupling 134 to restrain axial and rotational movement of the latch assembly 132 with respect to the downhole tubular 124.

The latch assembly 132 may be releasably locked to the latch coupling 134. That is, the latch coupling 134 may be configured to release the latch assembly 132 in response to the latch assembly 132 being pulled in the uphole direction 632 with at least a predetermined force. Alternatively, or additionally, the system may include a locking device that is configured to lock the latch assembly 132 in place until a particular manipulation may occur. For example, a particular amount of tension, compression, pressures, torsion, external signal, or force may be required to release the latch assembly 132 from a locked position. In some embodiments, a combination of one or more manipulations or signals may affect the release of the lock.

Moreover, the ability to provide systems and methods for securing the latch assembly 132 to the latch coupling 134 in a proper orientation and indexing the latch assembly 132 in response to improper orientation of the latch assembly 132 with respect to the latch coupling in constrained areas under harsh conditions (e.g., dirty environments or contaminated fluids), extreme pressures (e.g., >20,000-psi differential), extreme temperatures (e.g., <−20° F. or >300° F.), in remote locations makes this disclosure suitable for use in other remote locations with harsh environments such as outer space (e.g., satellites, spacecrafts, etc.), aeronautics (aircrafts), on-ground (swamps, marshes, etc.), below ground (mines, caves, etc.), ocean (on surface and subsea), subterranean (mineral extraction, storage wells (carbon sequestration, carbon capture and storage (CCS), etc.), and other energy recovery activities (geothermal, steam, etc.).

Figure 7:
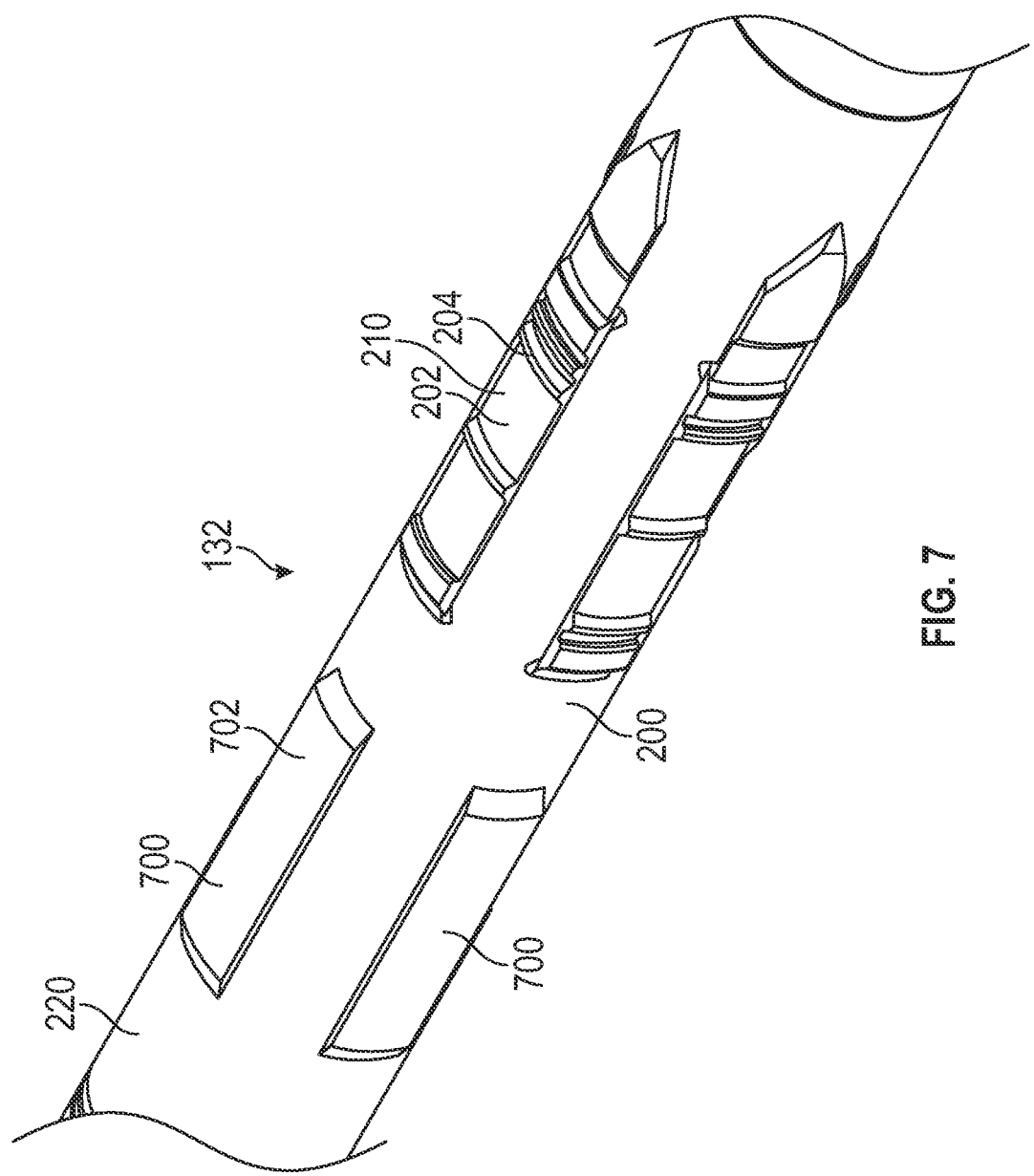
FIG. 7 illustrates a perspective view of a latch assembly having torque keys, in accordance with some embodiments of the present disclosure.

FIG. 7 illustrates a perspective view of a latch assembly having torque keys, in accordance with some embodiments of the present disclosure. As illustrated, the latch assembly 132 may include at least one torque key 700 secured to the radially outer surface 220 of the tubular body portion 200 of the latch assembly 132. The at least one torque key 700 may be configured to restrain rotation of the latch assembly 132 with respect to the downhole tubular 124 in response to axial alignment of the plurality of latch keys 204 of the latch assembly 132 with respect to plurality of key profiles 300 of the latch coupling 134. In particular, with the latch assembly 132 secured to the latch coupling 134, the at least one torque key 700 may be configured to interface with the downhole tubular 124 to restrain rotational movement of the latch assembly 132 with respect to the downhole tubular 124. Having the at least one torque key 700 to also restrain rotational movement of the latch assembly 132 with respect to the downhole tubular 124 may reduce strain on the latch features 202.

Each torque key 700 may be disposed uphole from a corresponding latch feature 202 of the latch assembly 132. Moreover, the torque keys 700 may be configured to actuate radially outward with respect to the latch assembly 132 in response to the latch assembly 132 coupling to the latch coupling 134 in a proper orientation. Any suitable actuator (e.g., Belleville springs, hydrostatic chambers, sliding supports, etc.) may be used to actuate the torque keys 700. The torque keys 700 may be configured to restrain rotation of the latch assembly 132 with respect to the downhole tubular 124 in an actuated position.

Alternatively, each torque key 700 may be disposed downhole from a corresponding latch feature 202 of the latch assembly 132. In addition, the torque keys 700 may be separate entities from other features of the latch assembly 132 (e.g., the latch feature 202, etc.). There may be one or more torque keys 700. The number of torque keys 700 may be more, or less, or of the same quantity as the other features of the latch assembly 132 (e.g., the latch features 202, the latch keys 204, etc.). Further, there may be more than one type of torque key 700. For example, at least one torque key 700 may be energized (e.g., spring loaded) and the remaining torque keys 700 may be rigid. Rigid torque keys 700 may always remain at the same height. Additionally, one or more of the torque keys 700 may occupy the same plane and one or more torque keys 700 may be spaced at different distances with respect to other corresponding features of the latch assembly 132 (e.g., the latch keys 204, datums, etc.). Moreover, the one or more torque keys 700 may be at a different orientation from the other features (e.g., latch features 202) relative to the longitudinal axis of the latch assembly 132 or another datum.

The torque keys 700 may have similar or different profiles, shapes, configurations, physical properties, features, from one another or from other features (e.g., the latch keys 204) of the latch assembly 132. For example, the torque keys 700 may have tapered ends, torque shoulders, angled sides, rotational guides to compliment other features (e.g., rotational guides, angled sides, angled guides surfaces, alignment features, ridges, flats, reliefs, etc.) illustrated in FIGS. 3, 6, and 8, etc. The torque keys 700 and/or the latch keys 204 may share the same energizing component(s) (e.g., springs, actuator(s), or different energizing components). The torque keys 700 and/or the latch keys 204 may share other component(s) features as well. For example, a first torque key 702 and the first latch key 210 may share the same retaining component (e.g., keepers or retainers). Likewise, one or more energizing components may operate on one latch key 204 that provides both torque resistance and axial resistance. Alternatively, or additionally, one or more retaining component may retain one or more latch key 204 whether the latch key 204 is for resisting/preventing torsional movement, resisting/prevent axial movement or some combination of both. Other components or sets of components may operate/function on one or more latch keys 204 of the same type.

Figure 8:
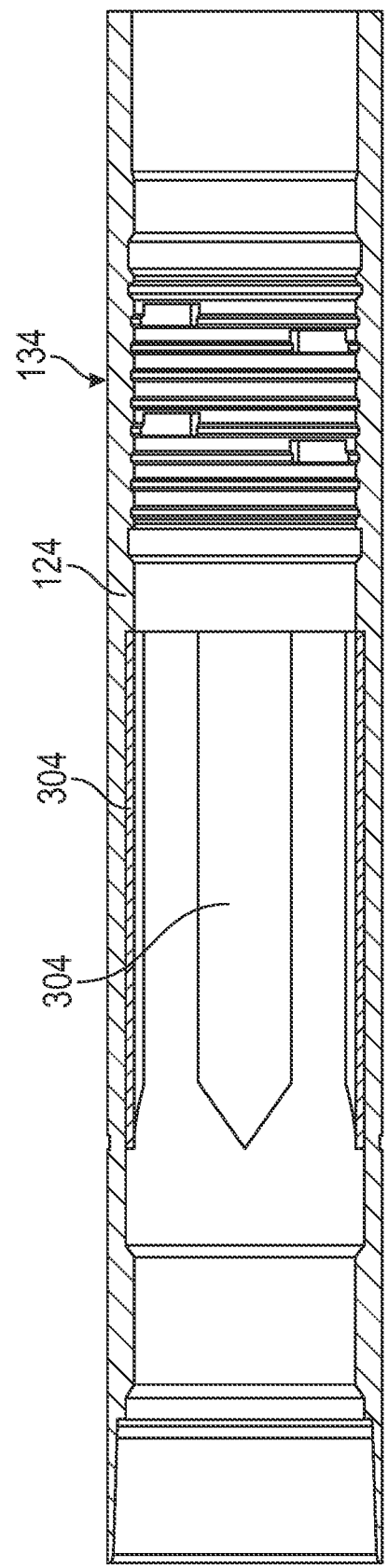
FIG. 8 illustrates a cross-sectional side view of a downhole tubular having long upper guide features, in accordance with some embodiments of the present disclosure.

FIG. 8 illustrates a cross-sectional side view of the downhole tubular 124 having long upper guide features, in accordance with some embodiments of the present disclosure. As set forth above, the upper guide features 304 are configured to drive rotation of the latch assembly 132 in response to contact between the upper guide features 304 and the latch features 202 of the latch assembly 132. However, as illustrated, the upper guide features 304 may have extended axial lengths such that at least a portion of the upper guide features 304 may be positioned to engage the at least one torque key 700 set forth above in FIG. 7. Having the long upper guide features 304 engage the at least one torque key 700 may increase the torque rating for the latch assembly 132. Additionally, having long upper guide features 304 may help ensure better latch-in and/or retrieval of the latch assembly 132. As illustrated, the upper guide features 304 may be disposed uphole from the latch coupling 134.

Figure 9:
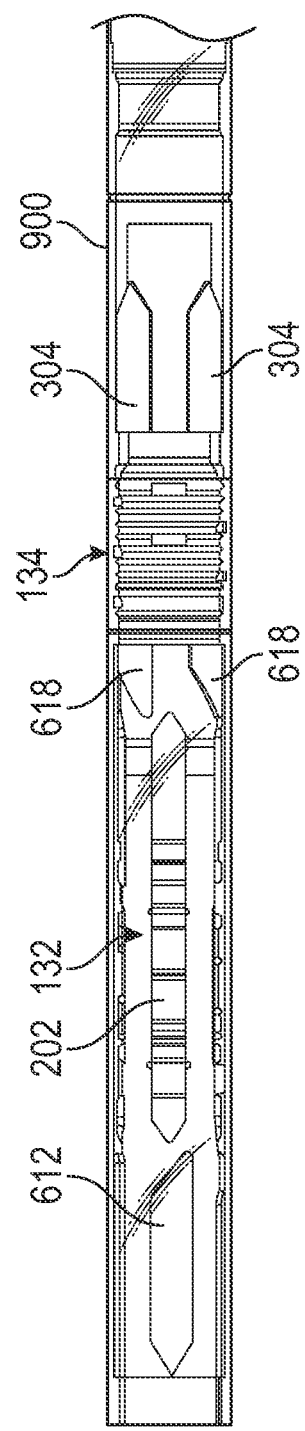
FIG. 9 illustrates a side view of the latch assembly and an inverted downhole tubular, in accordance with some embodiments of the present disclosure.

FIG. 9 illustrates a side view of the latch assembly and an inverted downhole tubular, in accordance with some embodiments of the present disclosure. As shown, the inverted downhole tubular and the latch coupling are partially transparent to help illustrate the alignment of the inverted downhole tubular with respect to the latch assembly. As illustrated, the inverted downhole tubular 900 may be oriented such that the at least one lower deflector feature 612 is disposed uphole from the latch coupling 134 of the inverted downhole tubular 900. Further, as illustrated, the lower guide features 618 may be disposed uphole from the latch coupling 134, and the upper guide features 304 may be disposed downhole from the latch coupling 134. Similar to the latch assembly 132 shown in FIGS. 6A-6M, axial movement of the latch assembly 132 with respect to the inverted downhole tubular 900 may be configured to index the latch assembly 132 with respect to the inverted downhole tubular 900. In particular, pulling the latch assembly 132 in the axially uphole direction to interface the latch features 202 with the lower deflector feature 612, and then lowering the latch assembly 132 in the axially downhole direction to the latch coupling 134 of the inverted downhole tubular 900 may be configured to index the latch assembly 132 with respect to the latch coupling 134.

Accordingly, the present disclosure may provide systems and methods for securing a latch assembly to a latch coupling in a proper orientation and indexing the latch assembly in response to improper orientation of the latch assembly with respect to the latch coupling. The systems and methods may include any of the various features disclosed herein, including one or more of the following statements.

Statement 1. A system, comprising: a downhole tubular having a central bore defined by an inner surface; a latch assembly securable to a conveyance, wherein the conveyance is configured to lower the latch assembly into the central bore of the downhole tubular, wherein the latch assembly comprises: a tubular body portion; a plurality of latch keys secured to the tubular body portion; and at least one alignment feature secured to the tubular body portion; a latch coupling formed on the inner surface of the downhole tubular, wherein the latch coupling includes a plurality of key profiles, wherein the plurality of latch keys are configured to engage corresponding key profiles of the plurality of key profiles in response to proper angular orientation of the latch assembly with respect to the latch coupling as the latch assembly is axially aligned with the latch coupling; and at least one guide feature extending radially inward from the inner surface of the downhole tubular, wherein the at least one guide feature is configured to rotate the latch assembly to angularly align the plurality of latch keys with the plurality of key profiles in response to contact with the at least one alignment feature.

Statement 2. The system of statement 1, wherein the plurality of latch keys are configured to engage corresponding key profiles of the plurality of key profiles to restrain axial and rotational movement of the latch assembly with respect to the downhole tubular.

Statement 3. The system of statement 1 or statement 2, wherein the latch assembly further comprises at least one actuator configured to bias at least one latch key of the plurality of latch keys in a radially outward direction with respect to the tubular body portion.

Statement 4. The system of any preceding statement, wherein the at least one actuator comprises a plurality of spring assemblies, wherein at least one spring assembly is disposed between at least one latch key of the plurality of latch keys and an outer surface of the tubular body portion of the latch assembly.

Statement 5. The system of any preceding statement, wherein the latch keys of the plurality of latch keys are spaced equally apart about a circumference of an outer surface of the tubular body portion of the latch assembly.

Statement 6. The system of any preceding statement, wherein each latch key of the plurality of latch keys includes at least one respective interface feature, wherein the at least one respective interface feature includes at least one protrusion, recess, or some combination thereof, corresponding to a shape of at least one key profile of the plurality of key profiles.

Statement 7. The system of any preceding statement, wherein each latch key includes a first key ridge, a second key ridge, and a third key ridge each protruding radially outward and configured to interface with respective recesses of a corresponding key profile.

Statement 8. The system of any preceding statement, wherein the at least one guide feature extends along the inner surface in an axial direction.

Statement 9. The system of any preceding statement, wherein the at least one guide feature includes a helical shape configured to rotate the latch assembly in response to contact between the latch assembly and the at least one guide feature as the latch assembly moves axially with respect to the at least one guide feature.

Statement 10. The system of any preceding statement, further comprising at least one torque key configured to restrain rotation of the latch assembly with respect to the downhole tubular, via an interface between the at least one torque key and the downhole tubular, in response to axial alignment of the plurality of latch keys of the latch assembly with respect to plurality of key profiles of the latch coupling.

Statement 11. The system of any preceding statement, wherein the plurality of latch keys includes a first unique latch key having a unique key configuration with respect to the remaining latch keys of the plurality of latch keys, wherein the first unique latch key is configured to only engage a corresponding first unique key profile of the latch coupling to restrain axial and rotational movement of the latch assembly with respect to the downhole tubular, and wherein the latch assembly is configured to move axially through the latch coupling in response to the first unique latch key being angularly offset from the first unique key profile.

Statement 12. The system of any preceding statement, wherein the at least one alignment feature comprises: at least one lower alignment feature secured to the tubular body portion in a position between the plurality of latch keys and a lower end of the tubular body portion, wherein the at least one lower alignment feature includes a lower wedge face; and at least one upper alignment feature secured to the tubular body portion in a position between the plurality of latch keys and an upper end of the tubular body portion, and wherein the at least one upper alignment feature includes an upper wedge face.

Statement 13. The system of any preceding statement, wherein the at least one guide feature comprises at least one upper guide feature extending radially inward from the inner surface of the downhole tubular, wherein the at least one upper guide feature is configured to rotate the latch assembly in a first direction to angularly align the plurality of latch keys with the plurality of key profiles in response to contact with the lower wedge face of the at least one lower alignment feature.

Statement 14. The system of any preceding statement, further comprising at least one lower deflector feature extending radially inward from the inner surface of the downhole tubular and disposed downhole from the latch coupling, wherein the at least one lower deflector feature is configured to rotate the latch assembly in the first direction to index the plurality of latch keys with respect to the plurality of key profiles in response to contact with the lower wedge face the at least one lower alignment feature.

Statement 15. The system of any preceding statement, wherein the at least one guide feature comprises at least one lower guide feature extending radially inward from the inner surface of the downhole tubular in a position axially between the at least one lower deflector feature and the latch coupling, and wherein the at least one upper guide feature includes a lower guide face configured to contact the upper wedge face of the at least one upper alignment feature to angularly align the indexed plurality of latch keys with corresponding key profiles of the plurality of key profiles.

Statement 16. A system, comprising: a downhole tubular having a central bore defined by an inner surface; a latch assembly securable to a conveyance, wherein the conveyance is configured to lower the latch assembly into the central bore of the downhole tubular, wherein the latch assembly comprises: a tubular body portion; a plurality of latch keys secured to a radially outer surface of the tubular body portion and spaced apart about a circumference of the tubular body portion, wherein a first latch key of the plurality of latch keys includes a unique key configuration; and a plurality of alignment features secured to the radially outer surface of the tubular body portion, wherein each alignment feature is secured axially between a corresponding latch key and a lower end of the tubular body portion; a latch coupling formed on the inner surface of the downhole tubular, wherein the latch coupling includes a plurality of key profiles angularly spaced about the inner surface of the downhole tubular, wherein a first key profile of the plurality of key profiles includes a unique key profile corresponding to the first latch key, wherein the latch assembly is configured to engage the latch coupling in response to the first latch key interfacing with the first key profile; and at least one upper guide feature extending radially inward from the inner surface of the downhole tubular, wherein the at least one upper guide feature is configured to rotate the latch assembly in a first direction to angularly align the plurality of latch keys with the plurality of key profiles in response to contact with a corresponding alignment feature of the plurality of alignment features.

Statement 17. The system of statement 16, wherein the latch assembly is configured to permit movement of the latch assembly through the latch coupling in response to the first latch key being angularly offset from the first key profile.

Statement 18. The system of statement 16 or statement 17, further comprising at least one lower deflector feature extending radially inward from the inner surface of the downhole tubular and disposed downhole from the latch coupling, wherein the at least one lower deflector feature is configured to rotate the latch assembly in the first direction to index the plurality of latch keys with respect to the plurality of key profiles in response to contact with a corresponding alignment feature of the plurality of alignment features.

Statement 19. The system of any of statements 16-18, wherein the at least one guide feature comprises at least one lower guide feature extending radially inward from the inner surface of the downhole tubular in a position axially between the at least one lower deflector feature and the latch coupling, and wherein the at least one lower guide feature includes a lower guide face configured to contact a corresponding alignment feature of the plurality of alignment features to rotate the latch assembly and angularly align the indexed plurality of latch keys with corresponding key profiles of the plurality of key profiles.

Statement 20. A system, comprising: a downhole tubular having a central bore defined by an inner surface; a latch assembly securable to a conveyance, wherein the conveyance is configured to lower the latch assembly into the central bore of the downhole tubular, wherein the latch assembly comprises: a tubular body portion; a plurality of latch keys secured to the tubular body portion; and at least one lower alignment feature secured to the tubular body portion in a position between the plurality of latch keys and a lower end of the tubular body portion; at least one upper alignment feature secured to the tubular body portion in a position between the plurality of latch keys and an upper end of the tubular body portion; a latch coupling formed on the inner surface of the downhole tubular, wherein the latch coupling includes a plurality of key profiles, wherein the plurality of latch keys are configured to engage corresponding key profiles of the plurality of key profiles in response to proper angular orientation of the latch assembly with respect to the latch coupling as the latch assembly is axially aligned with the latch coupling; at least one upper guide feature extending radially inward from the inner surface of the downhole tubular, wherein the at least one upper guide feature is configured to rotate the latch assembly in a first direction to angularly align the plurality of latch keys with the plurality of key profiles in response to contact with the at least one lower alignment feature; at least one lower deflector feature disposed downhole from the latch coupling, wherein the at least one lower deflector feature is configured to rotate the latch assembly in the first direction to index the plurality of latch keys with respect to the plurality of key profiles in response to contact with the at least one lower alignment feature; and at least one lower guide feature extending radially inward from the inner surface of the downhole tubular in a position axially between the at least one lower deflector feature and the latch coupling, and wherein the at least one upper guide feature includes a lower guide face configured to contact the at least one upper alignment feature to angularly align the indexed plurality of latch keys with corresponding key profiles of the plurality of key profiles.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A system, comprising:
a downhole tubular having a central bore defined by an inner surface;
a latch assembly securable to a conveyance, wherein the conveyance is configured to lower the latch assembly into the central bore of the downhole tubular, wherein the latch assembly comprises:
a tubular body portion;
a plurality of latch keys secured to the tubular body portion; and
at least one alignment feature secured to the tubular body portion;
a latch coupling formed on the inner surface of the downhole tubular, wherein the latch coupling includes a plurality of key profiles, wherein the plurality of latch keys are configured to engage corresponding key profiles of the plurality of key profiles in response to proper angular orientation of the latch assembly with respect to the latch coupling as the latch assembly is axially aligned with the latch coupling;
at least one upper guide feature extending radially inward from the inner surface of the downhole tubular, wherein the at least one upper guide feature is configured to rotate the latch assembly to angularly align the plurality of latch keys with the plurality of key profiles in response to contact with the at least one alignment feature; and
at least one lower guide feature extending radially inward from the inner surface of the downhole tubular in a position downhole from the latch coupling, and wherein the at least one lower guide feature is configured to contact the at least one alignment feature to angularly align the plurality of latch keys with corresponding key profiles of the plurality of key profiles.

2. The system of claim 1, wherein the plurality of latch keys are configured to engage corresponding key profiles of the plurality of key profiles to restrain axial and rotational movement of the latch assembly with respect to the downhole tubular.

3. The system of claim 1, wherein the latch assembly further comprises at least one actuator configured to bias at least one latch key of the plurality of latch keys in a radially outward direction with respect to the tubular body portion.

4. The system of claim 3, wherein the at least one actuator comprises a plurality of spring assemblies, wherein at least one spring assembly is disposed between at least one latch key of the plurality of latch keys and an outer surface of the tubular body portion of the latch assembly.

5. The system of claim 1, wherein the latch keys of the plurality of latch keys are spaced equally apart about a circumference of an outer surface of the tubular body portion of the latch assembly.

6. The system of claim 1, wherein each latch key of the plurality of latch keys includes at least one respective interface feature, wherein the at least one respective interface feature includes at least one protrusion, recess, or some combination thereof, corresponding to a shape of at least one key profile of the plurality of key profiles.

7. The system of claim 1, wherein each latch key includes a first key ridge, a second key ridge, and a third key ridge each protruding radially outward and configured to interface with respective recesses of a corresponding key profile.

8. The system of claim 1, wherein the at least one upper guide feature and the at least one lower guide feature extends along the inner surface in an axial direction.

9. The system of claim 1, wherein the at least one upper guide feature includes a helical shape configured to rotate the latch assembly in response to contact between the latch assembly and the at least one upper guide feature as the latch assembly moves axially with respect to the at least one upper guide feature.

10. The system of claim 1, further comprising at least one torque key configured to restrain rotation of the latch assembly with respect to the downhole tubular, via an interface between the at least one torque key and the downhole tubular, in response to axial alignment of the plurality of latch keys of the latch assembly with respect to plurality of key profiles of the latch coupling.

11. The system of claim 1, wherein the plurality of latch keys includes a first unique latch key having a unique key configuration with respect to the remaining latch keys of the plurality of latch keys, wherein the first unique latch key is configured to only engage a corresponding first unique key profile of the latch coupling to restrain axial and rotational movement of the latch assembly with respect to the downhole tubular, and wherein the latch assembly is configured to move axially through the latch coupling in response to the first unique latch key being angularly offset from the first unique key profile.

12. The system of claim 1, wherein the at least one alignment feature comprises:
   at least one lower alignment feature secured to the tubular body portion in a position between the plurality of latch keys and a lower end of the tubular body portion, wherein the at least one lower alignment feature includes a lower wedge face; and
   at least one upper alignment feature secured to the tubular body portion in a position between the plurality of latch keys and an upper end of the tubular body portion, and wherein the at least one upper alignment feature includes an upper wedge face.

13. The system of claim 12, wherein the at least one upper guide feature extends radially inward from the inner surface of the downhole tubular in a position uphole from the latch coupling, wherein the at least one upper guide feature is configured to rotate the latch assembly in a first direction to angularly align the plurality of latch keys with the plurality of key profiles in response to contact with the lower wedge face of the at least one lower alignment feature.

14. The system of claim 13, further comprising at least one lower deflector feature extending radially inward from the inner surface of the downhole tubular and disposed downhole from the latch coupling and the at least one lower guide feature, wherein the at least one lower deflector feature is configured to rotate the latch assembly in the first direction to index the plurality of latch keys with respect to the plurality of key profiles in response to contact with the lower wedge face of the at least one lower alignment feature.

15. The system of claim 14, wherein the at least one lower guide feature is disposed in a position axially between the at least one lower deflector feature and the latch coupling, and wherein the at least one lower guide feature includes a lower guide face configured to contact the upper wedge face of the at least one upper alignment feature to angularly align the indexed plurality of latch keys with corresponding key profiles of the plurality of key profiles.

16. A system, comprising:
   a downhole tubular having a central bore defined by an inner surface;
   a latch assembly securable to a conveyance, wherein the conveyance is configured to lower the latch assembly into the central bore of the downhole tubular, wherein the latch assembly comprises:
      a tubular body portion;
      a plurality of latch keys secured to a radially outer surface of the tubular body portion and spaced apart about a circumference of the tubular body portion, wherein a first latch key of the plurality of latch keys includes a unique key configuration; and
      a plurality of alignment features secured to the radially outer surface of the tubular body portion, wherein each alignment feature is secured axially between a corresponding latch key and a lower end of the tubular body portion;
   a latch coupling formed on the inner surface of the downhole tubular, wherein the latch coupling includes a plurality of key profiles angularly spaced about the inner surface of the downhole tubular, wherein a first key profile of the plurality of key profiles includes a unique key profile corresponding to the first latch key, wherein the latch assembly is configured to engage the latch coupling in response to the first latch key interfacing with the first key profile;
   at least one upper guide feature extending radially inward from the inner surface of the downhole tubular, wherein the at least one upper guide feature is configured to rotate the latch assembly in a first direction to angularly align the plurality of latch keys with the plurality of key profiles in response to contact with a corresponding alignment feature of the plurality of alignment features, and
   at least one lower deflector feature extending radially inward from the inner surface of the downhole tubular and disposed downhole from the latch coupling, wherein the at least one lower deflector feature is configured to rotate the latch assembly in the first direction to index the plurality of latch keys with respect to the plurality of key profiles in response to contact with a corresponding alignment feature of the plurality of alignment features.

17. The system of claim 16, wherein the latch assembly is configured to permit movement of the latch assembly through the latch coupling in response to the first latch key being angularly offset from the first key profile.

18. The system of claim 16, wherein the at least one guide feature comprises at least one lower guide feature extending radially inward from the inner surface of the downhole tubular in a position axially between the at least one lower deflector feature and the latch coupling, and wherein the at least one lower guide feature includes a lower guide face configured to contact a corresponding alignment feature of the plurality of alignment features to rotate the latch assembly and angularly align the indexed plurality of latch keys with corresponding key profiles of the plurality of key profiles.

19. A system, comprising:
   a downhole tubular having a central bore defined by an inner surface;
   a latch assembly securable to a conveyance, wherein the conveyance is configured to lower the latch assembly into the central bore of the downhole tubular, wherein the latch assembly comprises:
      a tubular body portion;
      a plurality of latch keys secured to the tubular body portion; and
      at least one lower alignment feature secured to the tubular body portion;
      at least one upper alignment feature secured to the tubular body portion;
   a latch coupling formed on the inner surface of the downhole tubular, wherein the latch coupling includes a plurality of key profiles, wherein the plurality of latch keys are configured to engage corresponding key profiles of the plurality of key profiles in response to proper angular orientation of the latch assembly with respect to the latch coupling as the latch assembly is axially aligned with the latch coupling;
   at least one upper guide feature extending radially inward from the inner surface of the downhole tubular, wherein the at least one upper guide feature is configured to rotate the latch assembly in a first direction to angularly align the plurality of latch keys with the plurality of key profiles in response to contact with the at least one lower alignment feature;
   at least one lower deflector feature disposed downhole from the latch coupling, wherein the at least one lower deflector feature is configured to rotate the latch assembly in the first direction to index the plurality of latch keys with respect to the plurality of key profiles in response to contact with the at least one lower alignment feature; and at least one lower guide feature extending radially inward from the inner surface of the downhole tubular in a position axially between the at least one lower deflector feature and the latch coupling, and wherein the at least one upper guide feature includes a lower guide face configured to contact the at least one upper alignment feature to angularly align the indexed plurality of latch keys with corresponding key profiles of the plurality of key profiles.

\* \* \* \* \*